(12) United States Patent
McKee

(10) Patent No.: US 12,469,375 B1
(45) Date of Patent: Nov. 11, 2025

(54) FLOOD WARNING APPARATUS AND SYSTEM

(71) Applicant: Scott Bruce McKee, Sugar Land, TX (US)

(72) Inventor: Scott Bruce McKee, Sugar Land, TX (US)

(*) Notice: Subject to any disclaimer, the term of this patent is extended or adjusted under 35 U.S.C. 154(b) by 0 days.

(21) Appl. No.: 19/295,818

(22) Filed: Aug. 11, 2025

(51) Int. Cl.
*G08B 21/10* (2006.01)
*G01S 19/42* (2010.01)
*G08B 3/10* (2006.01)
*G08B 31/00* (2006.01)

(52) U.S. Cl.
CPC .............. *G08B 21/10* (2013.01); *G01S 19/42* (2013.01); *G08B 3/10* (2013.01); *G08B 31/00* (2013.01)

(58) Field of Classification Search
CPC .......... G08B 21/10; G08B 3/10; G08B 31/00; G01S 19/42
See application file for complete search history.

(56) References Cited

U.S. PATENT DOCUMENTS

| | | | | |
|---|---|---|---|---|
| 4,973,947 A * | 11/1990 | Tax | ...................... | G08B 21/084 340/625 |
| 5,283,569 A * | 2/1994 | Nelson | .................. | H04M 11/04 379/106.01 |
| 5,460,462 A * | 10/1995 | Regan | ...................... | E06B 9/00 405/87 |
| 5,951,346 A * | 9/1999 | Woodall, Jr. | .......... | B63B 22/003 367/4 |
| 5,999,101 A * | 12/1999 | Gallagher | ............... | G01F 23/68 200/84 R |
| 6,160,482 A * | 12/2000 | Hill | ......................... | G01F 23/36 340/625 |
| 6,558,216 B2 * | 5/2003 | Yerazunis | .............. | G08B 21/10 441/11 |
| 7,554,453 B2 * | 6/2009 | Snyder | ................. | G08B 21/088 340/573.6 |
| 8,144,020 B2 * | 3/2012 | Snyder | ................. | G08B 21/088 340/529 |
| 8,274,861 B1 * | 9/2012 | Marn | ...................... | H04B 13/02 367/134 |
| 11,004,324 B1 * | 5/2021 | Sánchez | ................... | G01S 7/003 |
| 11,134,156 B1 * | 9/2021 | Al-Motairy | ........ | G08B 21/0469 |
| 11,920,318 B2 * | 3/2024 | Madden | ............. | E02D 29/1436 |

(Continued)

*Primary Examiner* — Hoi C Lau
(74) *Attorney, Agent, or Firm* — Smith & Woldesenbet Law Group, PLLC

(57) ABSTRACT

A flood warning apparatus may include: an extendable body that extends above a foundation, where the extendable body is configured to move within a range bounded by a minimum height and a maximum height based on a level of water in a waterway that covers the foundation; a platform disposed atop the extendable body, wherein the platform is buoyant; and. a floatation object having a notification mechanism, wherein the floatation object is configured to be retained by a retention feature of the platform when the position of the extendable body is less than the maximum height, where the floatation object is further configured to be released from the platform by the retention feature when the level of water in the waterway exceeds a threshold value, where the floatation object is buoyant, and where the notification mechanism activates when the floatation object is released from the platform by the retention feature.

20 Claims, 21 Drawing Sheets

(56) References Cited

U.S. PATENT DOCUMENTS

| | | | | |
|---|---|---|---|---|
| 2001/0004240 | A1* | 6/2001 | Freill | G08B 21/20 340/625 |
| 2003/0068936 | A1* | 4/2003 | Yerazunis | G01F 23/68 441/11 |
| 2006/0192679 | A1* | 8/2006 | Buckley | G01F 23/2885 340/618 |
| 2008/0150733 | A1* | 6/2008 | Snyder | G08B 21/088 340/573.6 |
| 2009/0251323 | A1* | 10/2009 | Snyder | G08B 21/088 340/573.6 |
| 2013/0094330 | A1* | 4/2013 | Holyoak | H04B 11/00 367/131 |
| 2014/0266745 | A1* | 9/2014 | Middleton | G01F 23/00 340/618 |
| 2014/0361887 | A1* | 12/2014 | Eskildsen | G08B 25/10 340/539.1 |
| 2015/0253178 | A1* | 9/2015 | Ligneul | E21B 17/012 367/99 |
| 2016/0258804 | A1* | 9/2016 | Desautels | G01F 23/36 |
| 2021/0071519 | A1* | 3/2021 | Gordon | E21B 47/11 |
| 2021/0183233 | A1* | 6/2021 | Castillo | G01F 23/30 |
| 2021/0262188 | A1* | 8/2021 | Madden | G01F 23/603 |

* cited by examiner

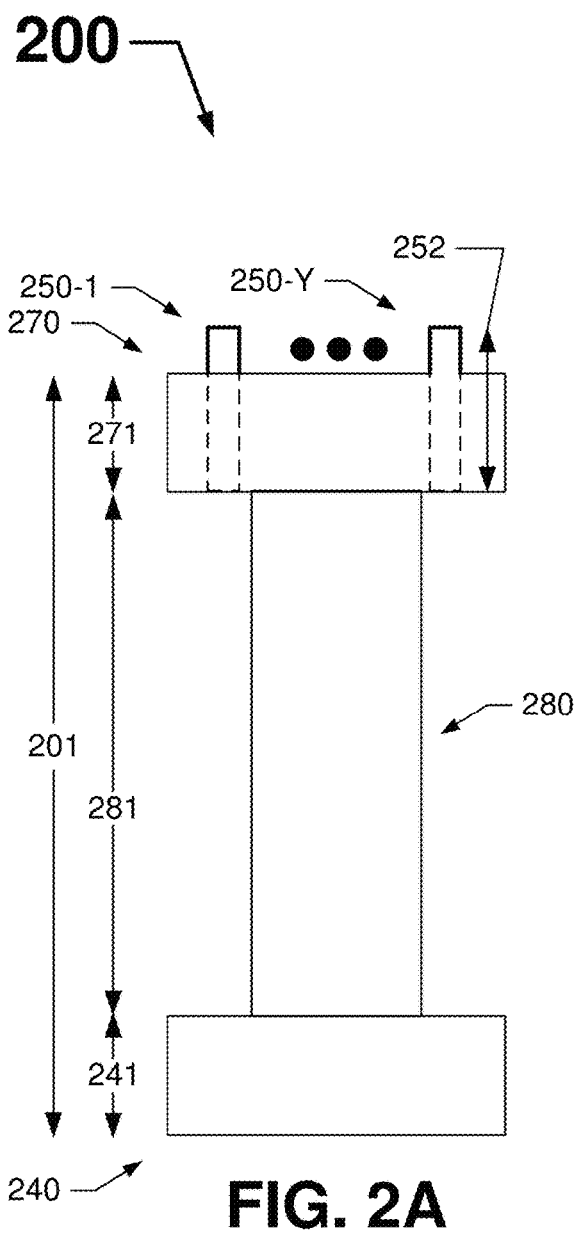
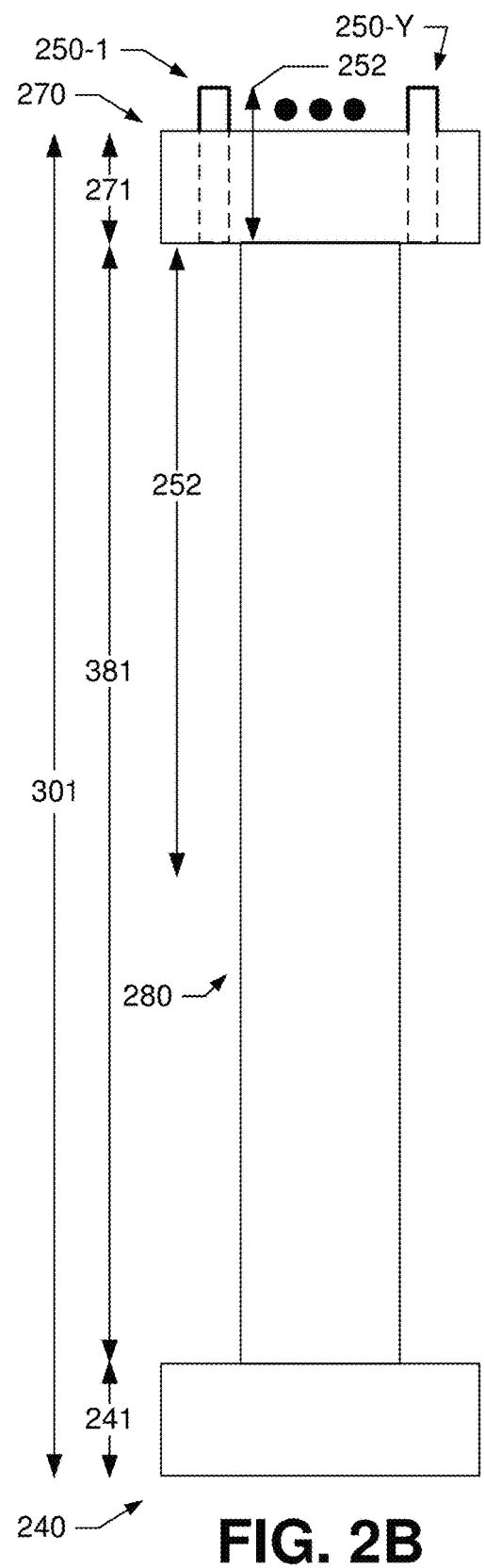
FIG. 2A
FIG. 2B

FLOOD WARNING APPARATUS AND SYSTEM

TECHNICAL FIELD

The present application is related to warning systems and, more particularly, to flood warning apparatuses and systems.

BACKGROUND

Periods of extraordinary rainfall in certain geographic areas may lead to flooding events, where water may run over the banks of creeks, bayous, rivers, and other waterways. In some cases, the rise in water may be rapid, leading to flash flooding events. Effective apparatuses and systems that can warn local residents and other people that are close to these waterways about a flood event as it is occurring can save lives and property.

SUMMARY

In general, in one aspect, the disclosure relates to a flood warning apparatus that may include a foundation configured to mount to a ground. The flood warning apparatus may also include an extendable body that extends above the foundation, where the extendable body is configured to move within a range bounded by a minimum body height and a maximum body height, and where the extendable body is configured to have a position within the range based on a level of water in a waterway that covers the foundation. The flood warning apparatus may further include a platform disposed atop the extendable body, where the platform comprises a retention feature, and where the platform is buoyant. The flood warning apparatus may also include a floatation object having a notification mechanism, where the floatation object is configured to be retained by the retention feature of the platform when the position of the extendable body is less than the maximum body height, where the floatation object is further configured to be released from the platform by the retention feature when the level of water in the waterway exceeds a threshold value, where the floatation object is buoyant, and where the notification mechanism is configured to activate when the floatation object is released from the platform by the retention feature.

In general, in another aspect, the disclosure relates to a real time flood event coordination system that may include a plurality of flood warning apparatuses, where each of the plurality of flood warning apparatuses is positioned in or proximate to a waterway. Each of the plurality of flood warning apparatuses may include a foundation configured to mount to a ground. Each of the plurality of flood warning apparatuses may also include an extendable body that extends above the foundation, where the extendable body is configured to move within a range bounded by a minimum body height and a maximum body height, and where the extendable body is configured to have a position within the range based on a level of water in a waterway that covers the foundation. Each of the plurality of flood warning apparatuses may further include a platform disposed atop the extendable body, where the platform comprises a retention feature, and wherein the platform is buoyant. Each of the plurality of flood warning apparatuses may also include a floatation object having a notification mechanism, where the floatation object is configured to be retained by the retention feature of the platform when the position of the extendable body is less than the maximum body height, where the floatation object is further configured to be released from the platform by the retention feature when the level of water in the waterway exceeds a threshold value, where the floatation object is buoyant, and where the notification mechanism is configured to activate when the floatation object is released from the platform by the retention feature. The real time flood event coordination system that may include a user system communicably coupled to the floatation object of each of the plurality of flood warning apparatuses, where the user system is configured to generate and send a notification about a flood event in the waterway based on the notification mechanism of at least one floatation object being activated.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 2A and 2B show a block diagram of an example flood warning apparatus according to certain example embodiments.

DETAILED DESCRIPTION

Figure 1A:
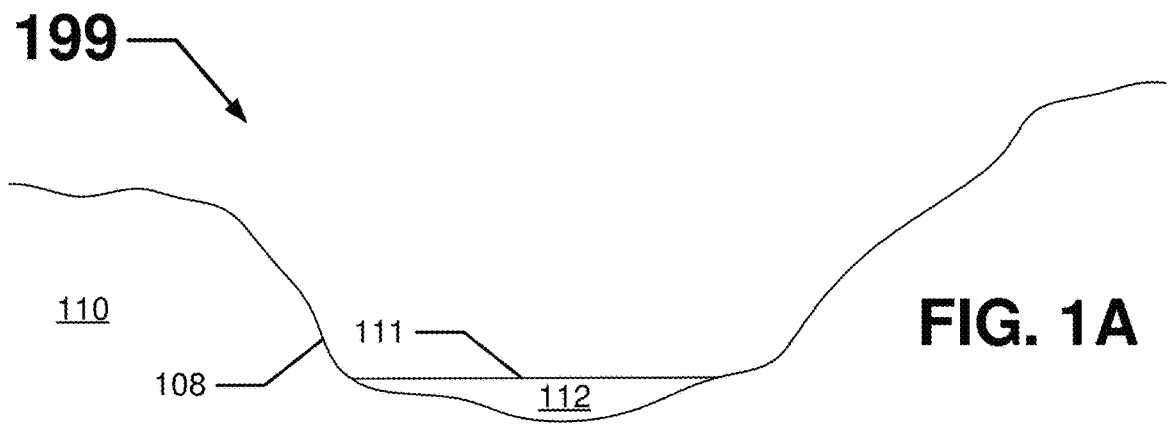
FIGS. 1A through 1C show a waterway in which example flood warning apparatuses may be used according to certain example embodiments.
Figure 1B:
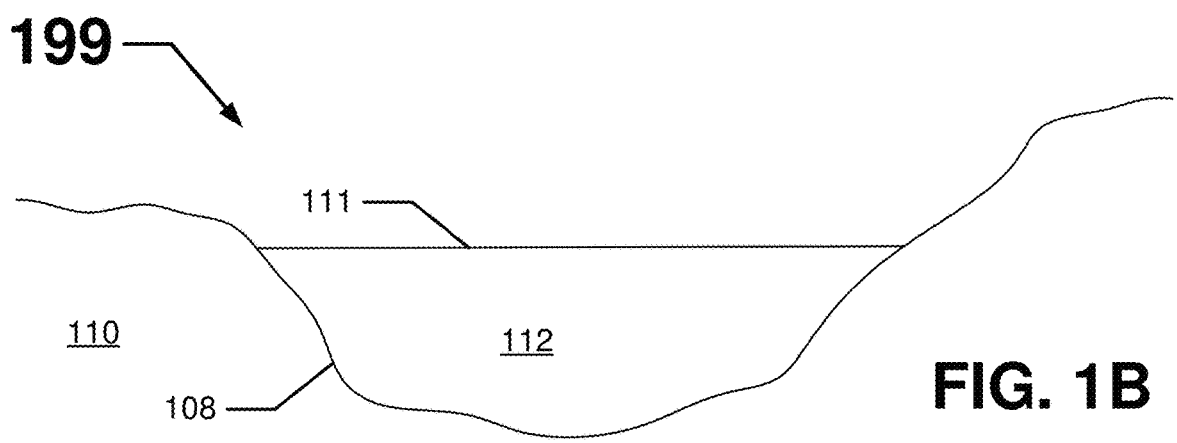
Figure 1C:
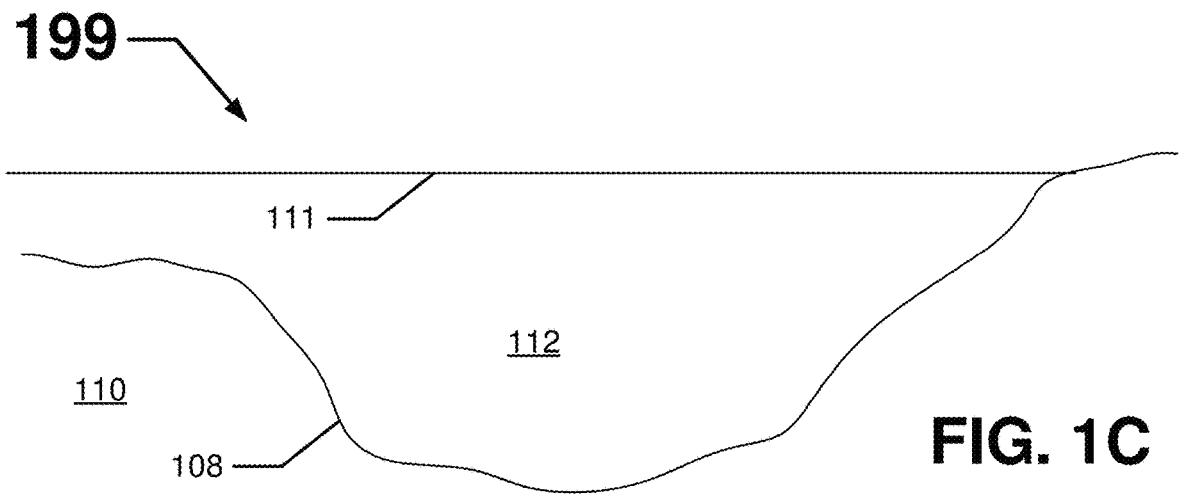

FIGS. 1A through 1C show a waterway 199 in which example flood warning apparatuses may be used according to certain example embodiments. Specifically, FIG. 1A shows the waterway 199 when the waterline 111 of the water 112 is at a relatively low point. The waterway 199 is formed by ground 108 that varies in elevation. In this case, the ground 108 (e.g., rock, grass, weeds, dirt, clay, cement) is positioned atop Earth 110. FIG. 1B shows the waterway 199 at a different point in time relative to the time captured in FIG. 1A. In FIG. 1B, the volume of water 112 is increased and the waterline 111 is raised relative to what is shown in FIG. 1A. FIG. 1C shows the waterway 199 at a different point in time relative to the time captured in FIGS. 1A and 1B. In FIG. 1C, the volume of water 112 is increased and the waterline 111 is raised relative to what is shown in FIGS. 1A and 1B to the extent that the water 112 is over the bank on the left side.

The waterway 199 may be on private property, public land (e.g., city-owned, county-owned, state-owned, federally-owned), or a combination thereof. The waterway 199 may be within a single jurisdiction (e.g., a single country, a single state) or multiple jurisdictions (e.g., multiple counties, multiple states, multiple countries). The length of a waterway 199 may be thousands of feet, tens of miles, hundreds of miles, over a thousand miles, or some other suitable length defined by the path of the waterway 199, including portions thereof. The waterway may be continuous or divided into multiple segments where each segment may have the same length or different lengths.

FIGS. 2A and 2B show a block diagram of an example flood warning apparatus 200 according to certain example embodiments. Specifically, FIG. 2A shows a side view of the extendable body 280 (and so also the flood warning apparatus 200) at a minimum height 281. FIG. 2B shows a side view of the extendable body 280 (and so also the flood warning apparatus 200) at a maximum height 381. Referring to the description above with respect to FIGS. 1A through 1C, the example flood warning apparatus 200 of FIGS. 2A and 2B includes the extendable body 280, a foundation 240, a platform 270, and one or more floatation objects 250.

The foundation 240 of the example flood warning apparatus 200 in FIGS. 2A and 2B is configured to mount to the ground (e.g., ground 108) and penetrate, to some extent, into the Earth (e.g., Earth 110). The foundation 240 may be or include one or more of a number of materials (e.g., steel, cement, gravel). For example, the foundation 240 may be or include cement that is poured into a hole in the Earth 110 (e.g., around the proximal end of the extendable body 280) and cured. The foundation 240 is designed to keep the rest of the flood warning apparatus 200 in a relatively fixed lateral position during one or more conditions (e.g., heavy rain, turbulent flow of water (e.g., water 112) in a waterway (e.g., waterway 199), high waterline (e.g., waterline 111), low waterline, drought, freezing temperatures, excessive heat and/or humidity) over an extended period of time (e.g., 5 years, 10 years, 20 years, 30 years, 50 years, 100 years). The foundation 240 has a height 241 (also sometimes called a foundation height 241 herein). Some of the height 241 of the foundation 240 may be buried in the Earth (e.g., Earth 110), and some of the height 241 of the foundation 240 may be positioned above the ground (e.g., ground 108).

The extendable body 280 of the example flood warning apparatus 200 in FIGS. 2A and 2B extends above the foundation 240. In certain example embodiments, the proximal end of the extendable body 280 is coupled to and/or integrated with the foundation 240. For example, the proximal end of the extendable body 280 may be directly or indirectly coupled to the foundation 240 using one or more of a number of coupling features (e.g., bolts, welding, mating threads). In this way, the coupling features of the proximal end of the extendable body 280 complement the coupling features of the foundation 240.

The extendable body 280 may be configured to move within a range 252 bounded by a minimum height 281 (also sometimes called a minimum body height 281 herein), as shown in FIG. 2A, and a maximum height 381 (also sometimes called a maximum body height 381 herein), as shown in FIG. 2B. When the extendable body 280 is at the minimum height 281, the flood warning apparatus 200 has a minimum height 201 (also sometimes called a flood warning apparatus minimum height 201 herein). In this case, the minimum height 201 is the sum of the height 241, the height 281, and the height 271. Similarly, in this case, the maximum height 301 is the sum of the height 241, the height 381, and the height 271. When the extendable body 280 is at the maximum height 381, the flood warning apparatus 200 has a maximum height 301 (also sometimes called a flood warning apparatus maximum height 301 herein).

Figure 4A:
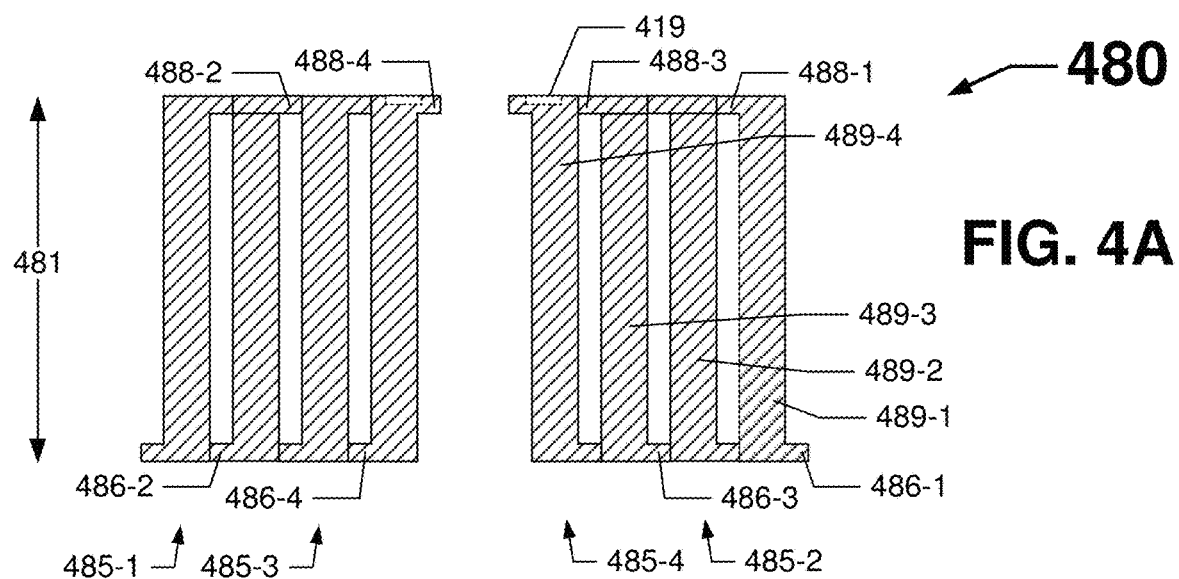
FIGS. 4A and 4B show cross-sectional side views of an example extendable body of a flood warning apparatus according to certain example embodiments.
Figure 4B:
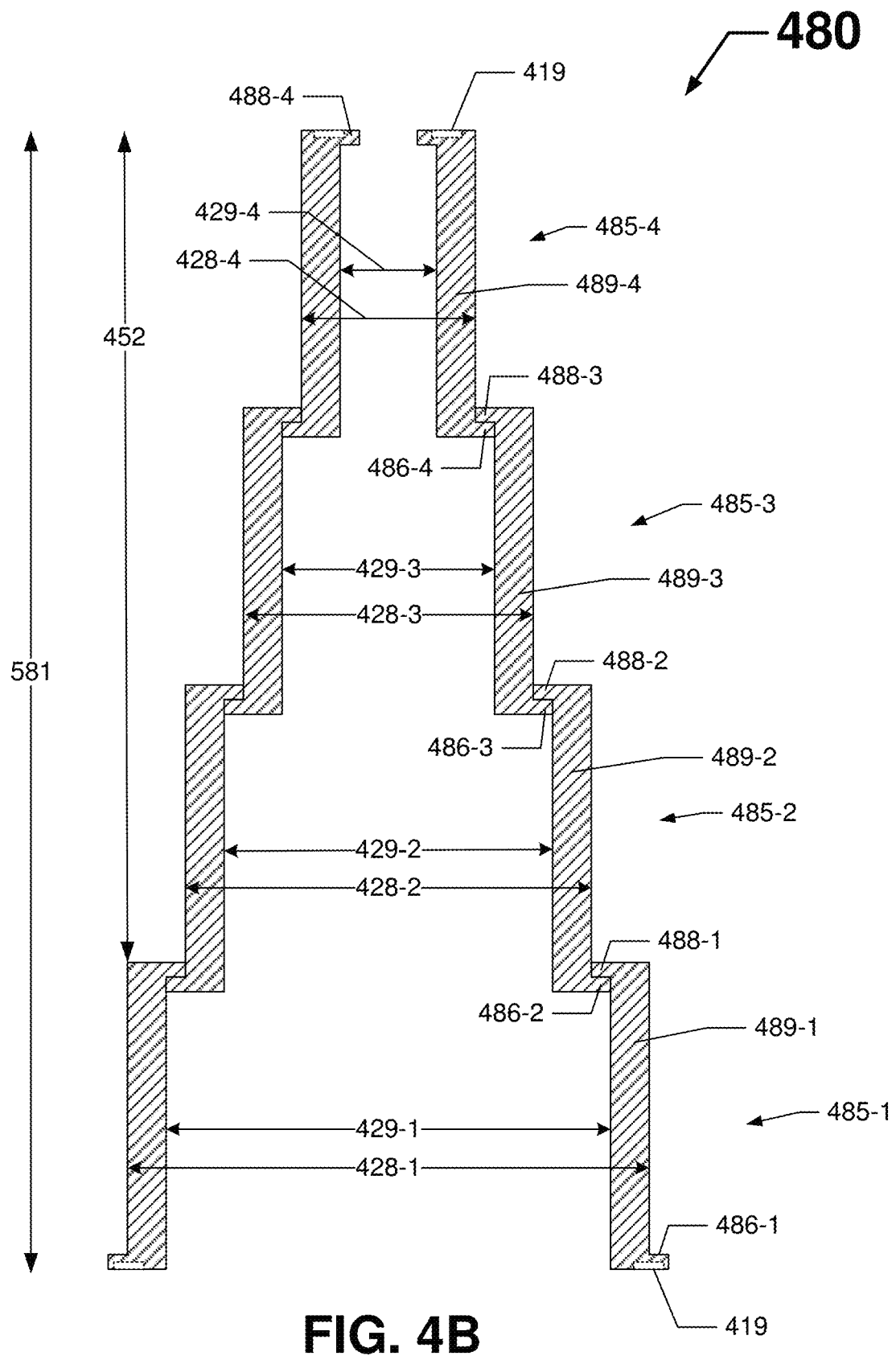

The extendable body 280 is configured to have a position within the range 252 that is based on a level (e.g., a waterline 111) of water (e.g., water 112) in a waterway (e.g., 199) that covers the foundation 240. The movement of the extendable body 280 within the range 252 may be mechanically driven (e.g., using a motor, using a hydraulic system, using a pneumatic system), based on buoyancy, and/or using some other method or principal. The extendable body 280 may have one or more configurations that allows the position of the extendable body 280 to move within the range 252 between the minimum height 281 and the maximum height 381. For example, as shown in FIGS. 4A and 4B below, the extendable body 280 may be or include multiple pieces or segments that have a telescoping configuration. As another example, the extendable body 280 may be or include one or more pistons. As yet another example, the extendable body 280 may be an accordion-like configuration.

In certain example embodiments, the extendable body 280 is configured to move between the minimum height 281 and the maximum height 381 a large number of times (e.g., hundreds of times, thousands of times) without fail or the need for maintenance over an extended period of time (e.g., 5 years, 10 years, 20 years, 30 years, 50 years, 100 years). The extendable body 280 may be made of one or more of a number of materials that are configured to maintain the structural integrity (e.g., no significant corrosion) of extendable body 280, as well as the ability to adjust its height in varying levels of water, over an extended period of time (e.g., 5 years, 10 years, 20 years, 30 years, 50 years, 100 years). Examples of such materials may include, but are not limited to, steel, a composite material, a ceramic material, and stone. In some cases, the distal (top) end of the extendable body 280 is made of a material that is buoyant in water.

The platform 270 of the example flood warning apparatus 200 in FIGS. 2A and 2B is disposed atop (e.g., at the distal end of) the extendable body 280. The platform 270 may be directly or indirectly coupled to the distal end of the extendable body 280 using one or more of a number of coupling features (e.g., bolts, welding, mating threads). In this way, the coupling features of the platform 270 complement the coupling features of the distal end of the extendable body 280.

The platform 270 is configured to retain the floatation objects 250 until certain conditions (e.g., high waterline (e.g., waterline 111) relative to the position of the extendable body 280) have been met. In certain embodiments, the platform 270 is made of a material that floats in water (e.g., water 112). In this way, when the waterline 111 is above the minimum height 281 (but below the maximum height 381) of the extendable body 280 and rising, the floatation characteristics of the platform 270 will cause the extendable body 280 to increase in length toward the maximum height 381.

Similarly, when the waterline 111 is below the maximum height 381 (but above the minimum height 281) of the extendable body 280 and lowering, the floatation characteristics of the platform 270 will cause the extendable body 280 to decrease in length toward the minimum height 281. As discussed in more detail below with respect to FIG. 3, the platform 270 may include one or more of a number of features, including but not limited to one or more walls, one or more retention features, one or more sensor devices, and a controller. In addition, the platform 270 may be made of one or more of a number of suitable materials that are designed to maintain the structural and functional integrity of the platform 270 in outdoor conditions over an extended period of time (e.g., 5 years, 10 years, 20 years, 30 years, 50 years, 100 years). The platform 270 has a height 271 (also sometimes called a platform height 271 herein) that may be substantially fixed over time.

Each floatation object 250 of the example flood warning apparatus 200 in FIGS. 2A and 2B is designed to be released from the platform when certain flood-related conditions are met relative to the flood warning apparatus 200 and provide some type of notification for some period of time (e.g., 30 minutes, an hour, 24 hours) after being released. Within the limitations (e.g., size, number of retention features) of the platform 270, a flood warning apparatus 200 may have one or more (e.g., 1, 2, 3, 5, 8, 12) floatation objects 250. In this case, the flood warning apparatus 200 has Y floatation objects 250 (floatation object 250-1 through floatation object 250-Y). When a flood warning apparatus 200 has multiple floatation objects 250, the configuration of one floatation object 250 may be the same as, or different than, the configuration of one or more of the other floatation objects 250. For example, when a flood warning apparatus 200 has multiple floatation objects 250, each floatation object 250 may be released under different conditions (e.g., different levels of water 112). In addition, or in the alternative, when a flood warning apparatus 200 has multiple floatation objects 250, two or more of the floatation objects 250 may be released under the same conditions but provide a different type of notification (e.g., audio, visual).

A floatation object 250 includes one or more of a number of components. As discussed in more detail below with respect to FIG. 5, examples of components of a floatation object 250 may include, but are not limited to, a controller, one or more sensor devices, one or more notification mechanisms, and a retention feature. In certain embodiments, a floatation object 250 is made of a material that floats in water (e.g., water 112). In this way, when a floatation object 250 is released from the platform 270, the floatation object 250 stays buoyant and is carried by the water at the waterline (e.g., waterline 111) so that it is able to provide its alert notification (e.g., broadcast sound, emit light) directly into the surrounding environment.

In certain example embodiments, a floatation object 250 is configured to be retained by the retention feature (discussed below) of the platform 270 when the position of the extendable body 280 is less than the maximum body height 381. In some cases, a floatation object 250 may also be configured to be released from the platform 270 by the retention feature when the level (e.g., waterline 111) of water (e.g., water 112) in a waterway (e.g., waterway 199) exceeds the platform 270 (i.e., exceeds the maximum height 301). In certain example embodiments, the alert notification mechanism of a floatation object 250 is configured to activate when the floatation object 250 is released from the platform 270 by the retention feature.

Figure 3:
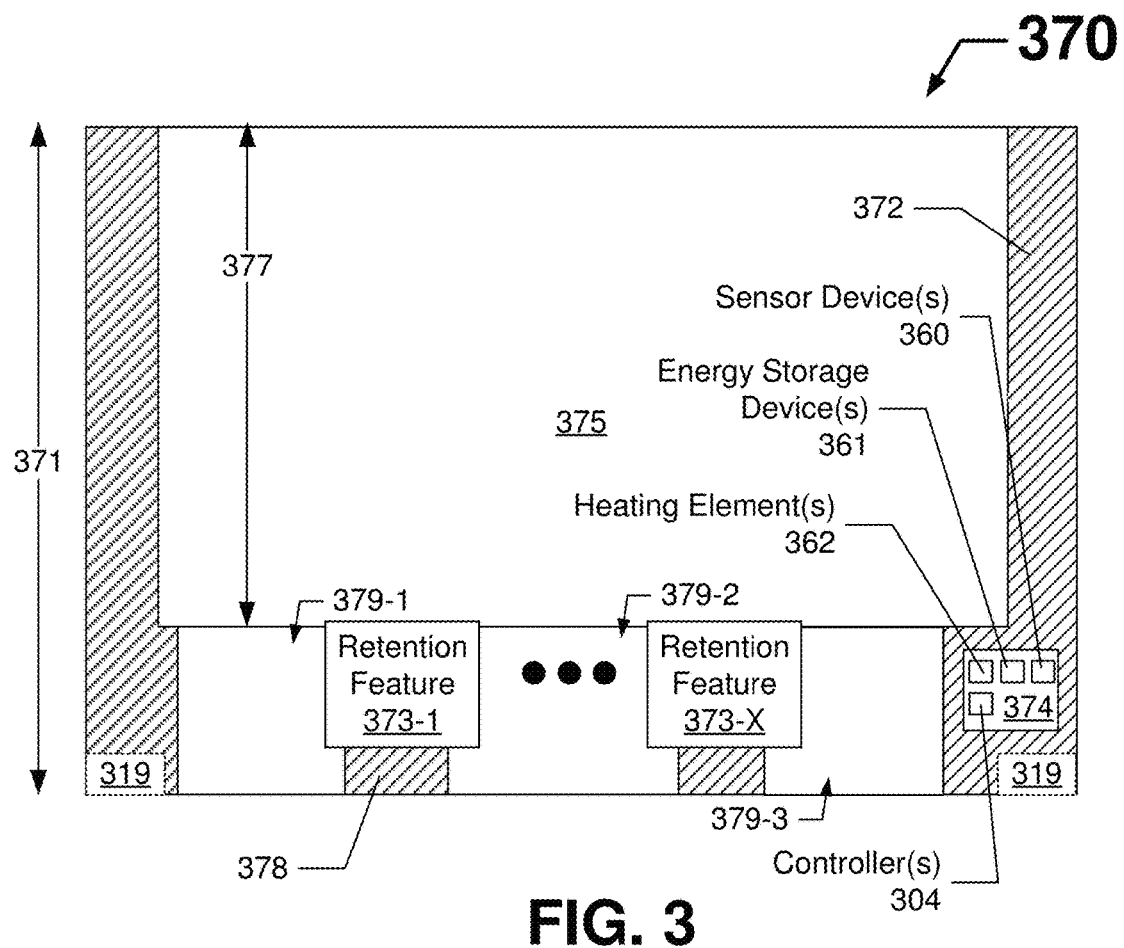
FIG. 3 shows a cross-sectional side view of an example platform of a flood warning apparatus according to certain example embodiments.

FIG. 3 shows a cross-sectional side view of an example platform 370 of a flood warning apparatus (e.g., flood warning apparatus 200) according to certain example embodiments. Referring to the description above with respect to FIGS. 1A through 2, the platform 370 of FIG. 3 is an example embodiment of the platform 270 discussed above with respect to FIG. 2. As discussed above, the platform 370 may include one or more of a number of components. In this case, the platform 370 includes a controller 304, one or more sensor devices 360, one or more energy storage devices 361, one or more optional heating elements 362, one or more optional coupling features 319, and one or more retention features 373.

The platform 370 in this case has at least one side wall 372 and a bottom wall 378. The one or more side walls 372 and the bottom wall 378 form a cavity 375 that is open at the top. As such, the cavity 375 has a height 377 that is less than the height 371 of the platform 370. The height 377 of the cavity 375 is configured to receive and retain each of the floatation objects (e.g., floatation objects 250) of the flood warning apparatus (e.g., flood warning apparatus 200) until the floatation objects are ready to be released. For example, the cavity 375 may have a height 377 (defined by the distance between the top of the bottom wall 378 and the top of the side wall 372) that is more than ½ the height of each floatation object in the cavity 375. In this way, the one or more side walls 372 provide some protection (e.g., from wind) to the floatation objects positioned within the cavity 375. When viewed from above, the one or more side walls 372 of the platform 370 may form one or more of a number of shapes. Examples of such shapes may include, but are not limited to, a circle, a square, a triangle, an oval, a hexagon, a rectangle, an octagon, and a random shape.

In certain example embodiments, the platform 370 has one or more channels 379 that traverse the thickness of the bottom wall 378 and/or one or more of the side walls 372. There can be (e.g., 1, 2, 3, 5, 10, 20, 35, 50) channels 379 that traverse the thickness of the bottom wall 378 and/or one or more of the side walls 372. In this case, there are three channels 379 (channel 379-1, channel 379-2, and channel 379-3) that traverse the thickness of the bottom wall 378 and no channels that traverse the side walls 372. Each channel 379 is configured to allow for an equilibrium in the waterline (e.g., waterline 111) outside the cavity 375 and the waterline within the cavity 375. When the platform 370 has multiple channels 379, the characteristics (e.g., shape, size) of one channel 379 may be the same as, or different than, the corresponding characteristics of one or more of the other channels 379.

In certain example embodiments, the platform 370 is configured to float on water (e.g., water 112). As such, with the platform 370 disposed atop the distal end of the extendable body (e.g., extendable body 280), the platform 370 adjusts the position of the extendable body within the range (e.g., range 252) when the water level (e.g., 111) is no greater than a height of the platform 370 when the extendable body is at the maximum height (e.g., maximum height 381). Similarly, because of the floatation of the platform 370, the platform 370 maintains the extendable body at the maximum height when the water level exceeds the height of the platform 370. In order to float on water, some or all of the platform 370 may be made of one or more of a number of materials. Examples of such materials may include, but are not limited to, plastic, polyethylene, polypropylene, hard foam, a composite, a polymer, and a ceramic material.

In some cases, as shown in FIG. 3, part of the bottom wall 378 and/or one or more of the side walls 372 has a chamber 374 that is positioned therewithin. The chamber 374 may be isolated from the cavity 375 and the environment outside the platform 370, thereby offering some degree of protection from the components therein. Within the chamber 374 in this example are one or more controllers 304, one or more of the sensor devices 360 (or portions thereof), one or more energy storage devices 361 (or portions thereof), and one or more heating elements 362 (or portions thereof).

A sensor device 360 of the platform 370 may be integrated with and/or coupled to one or more of the walls (e.g., a side wall 372, the bottom wall 378) of the platform 370. A sensor device 360 of the platform 370 includes one or more sensors that measure one or more parameters (e.g., pressure, flow rate, temperature, humidity, water level, water force). Examples of a sensor of a sensor device 360 may include, but are not limited to, a temperature sensor, a flow sensor, a pressure sensor, a water sensor, a load cell, an ice detector, and a camera. A sensor device 360 may measure one or more parameters at a time with respect to the platform 370. For example, a sensor device 360 may be configured to measure the height (e.g., the maximum height 301, the minimum height 201, a height between the minimum height 201 and the maximum height 301) of the flood warning apparatus.

As another example, a sensor device 360 may be configured to measure the level of water inside the cavity 375. As yet another example, a sensor device 360 may be configured to measure the ambient temperature. As still another example, a sensor device 360 may be configured to measure the ambient humidity. As yet another example, a sensor device 360 may be configured to measure a parameter (e.g., the flow rate against the platform 370) associated with water (e.g., water 112) in a waterway (e.g., waterway 199). As still another example, a sensor device 360 may be configured to measure a parameter associated with whether a retention feature 373 is engaged with a floatation object (e.g., floatation object 250), including an associated retention feature thereof, or disengaged with a floatation object, including an associated retention feature thereof.

As yet another example, a sensor device 360 may be configured to detect if there are foreign objects (e.g., a branch, fallen leaves) within the cavity 375 of the platform 370 that may need to be removed in order for the floatation objects (e.g., floatation objects 250) to be released and activated properly when the appropriate conditions arise. As another example, a sensor device 360 may be configured to detect if ice has formed or is beginning to form on the platform.

A sensor device 360 may measure a parameter continuously, periodically (e.g., every 10 minutes, every hour), upon the occurrence of an event (e.g., the extendable body 280 reaches its maximum height 381), and/or based on some other factor. A sensor device 360 of the platform 370 may be substantially the same as a sensor device 660 of FIG. 6. Some or all of the details of a sensor device 660 discussed below with respect to FIG. 6 may apply to a sensor device 360 of the platform 370 of FIG. 3.

A controller 304 of the platform 370 may be configured to communicate with each of the sensor devices 360 of the platform 370. In this way, a controller 304 of the platform 370 may control the operation of one or more of the sensor devices 360 and/or receive measurements made by the sensor devices 360. A controller 304 may also be configured to process and/or use (e.g., in a model) the measurements received from the sensor devices 360. In some cases, a controller 304 of the platform 370 may be configured to communicate with one or more other components and/or entities (e.g., a user system, another controller 304 of the platform 370, a retention feature 373 of the platform 370, a controller of a floatation object (e.g., floatation object 250)). The platform 370 may have one or more (e.g., 0, 1, 2, 3, 5, 10) controllers 304.

A controller 304 of the platform 370 may be substantially the same as a controller 604 of FIG. 6. Some or all of the details of a controller 604 discussed below with respect to FIG. 6 may apply to a controller 304 of the platform 370 of FIG. 3. For example, a controller 304 of the platform 370 may be configured to include a transceiver (e.g., a receiver, a transmitter) and a communication module in order to communicate conditions (e.g., height of the flood warning apparatus 200, status of the floatation objects 250, whether the platform 370 is under water 112, charge level of the energy storage devices 361) about the platform 370 (including one or more of its components) with a user system of a user (also discussed below with respect to FIG. 6).

The platform 370 may include one or more (e.g., 0, 1, 2, 3, 5, 10) energy storage devices 361. Each energy storage device 361 is designed to provide power of the type (e.g., alternating current, direct current) and level (e.g., 12V, 120V, 24V) that is required by one or more other components of the platform 370. An energy storage device 361 may be or include one or more types of electrical storage component, including but not limited to a battery, a supercapacitor, and a fuel cell. An energy storage device 361 may include one or more of a number of other components needed to perform its functions, including but not limited to a switch, an inverter, a converter, an electrical cable, a resistor, a capacitor, a diode, a transformer, and a protective relay.

In some cases, an energy storage device 361 may be rechargeable. In such a case, an energy storage device 361 may include a solar panel that is mounted on and/or integrated with a wall (e.g., a side wall 372) of the platform 370 to allow the solar panel to be exposed to solar radiation in the environment. Those of ordinary skill in the art will appreciate that other types of technology, whether currently existing or developed in the future, may be used to recharge an energy storage device 361 of the platform 370. Similarly, an energy storage device 361 may take the form of a technology that is developed in the future.

The platform 370 may include one or more (e.g., 0, 1, 2, 3, 5, 10) heating elements 362. Each heating element 362 is designed to increase the temperature of one or more side walls 372, the bottom wall 378, and/or one or more of the retention features 373. Specifically, a heating element 362 may be configured to radiate heat in an amount sufficient to melt ice and/or to prevent the formation of ice on a localized basis within the cavity 375 of the platform 370. A heating element 362 may be integrated into one or more side walls 372, the bottom wall 378, and/or one or more of the retention features 373. In addition, or in the alternative, a heating element 362 may be disposed on an outer surface of one or more side walls 372, the bottom wall 378, and/or one or more of the retention features 373.

A heating element 362 may operate based on one or more parameters (e.g., temperature, moisture, presence of ice, humidity, dew point) measured by one or more sensor devices 360 that indicates to a controller 304 that ice within the platform 370 may be present or forming. If ice forms, the ice may inhibit or prevent a floatation object (e.g., floatation object 250) from being released when conditions warrant the release of the floatation object by a retention feature 373. Such a situation may arise, for example when a severe rain event occurs with temperatures near freezing. A heating element 362 may operate using power provided by one or more of the energy storage devices 361. Such power (e.g., the provision of power, the ceasing of power) may be controlled by a controller 304.

One or more of the walls (e.g., a side wall 372, the bottom wall 378) may include one or more coupling features 319 (e.g., threaded apertures, slots, tabs, clips, a bottom surface for welding, a snap fitting) that are configured to directly or indirectly couple to one of more coupling features (e.g., coupling features 419 discussed below with respect to FIGS. 4A and 4B) of the extendable body (e.g., extendable body 280) of the flood warning apparatus (e.g., flood warning apparatus 200). In certain example embodiments, the coupling features 319 are secure enough to overcome the buoyancy of the platform 370 to keep the platform 370 coupled to the extendable body (e.g., extendable body 280) when the extendable body is at its maximum height (e.g., maximum height 381) and the height of the waterline (e.g., waterline 111) exceeds the maximum height (e.g., maximum height 301) of the flood warning apparatus (e.g., flood warning apparatus 200) (and so keeps the platform 370 submerged in the water (e.g., water 112).

The platform 370 includes one or more (e.g., 1, 2, 3, 5, 8, 10) retention features 373. In this case, there are X retention features 373 (retention feature 373-1 through retention feature 373-X). Each retention feature 373 is configured to retain a floatation object (e.g., floatation object 250) until a condition (e.g., the platform 370 is entirely submerged in water, when the extendable body (e.g., extendable body 280) exceeds a certain height within the range (e.g., range 252)) arises that causes the retention feature 373 to release and fully activate the floatation object. While a floatation object is retained by a retention feature 373, the floatation object is at least partially deactivated (e.g., the notification mechanism (discussed below with respect to FIG. 5) is deactivated).

A retention feature 373 may have one or more configurations using one or more components. For example, a retention feature 373 may be or include one or more magnets and/or an electrically created magnetic field (e.g., in the form of a reed switch) that uses magnetic forces to retain a floatation object having a magnet of the opposite polarity. In such a case, when the waterline (e.g., waterline 111) exceeds a certain height (e.g., above the height 371 of the platform 370), the buoyancy of the floatation object (e.g., floatation object 250) overcomes the magnetic attraction of the magnetic field of the retention feature 373 on the magnet in the floatation object, allowing the floatation object to be released. As the magnetic field emitted by the retention feature 373 fades and eventually disappears as the floatation object separates and moves further away from the retention feature 373, the floatation object may fully activate.

A retention feature 373 may operate electrically, mechanically, electromechanically, magnetically, electromagnetically, hydraulically, pneumatically, and/or using another practical means of retention of a floatation object (e.g., floatation object 250) in a way that complements the configuration of the floatation object. When a retention feature 373 requires power to operate, the power may be supplied by one or more of the energy storage devices 361. When a retention feature 373 requires control to operate, the control may be supplied by one or more of the controllers 304. When a retention feature 373 requires a measurement of a parameter to operate, the measurement may be supplied by one or more of the sensor devices 360.

FIGS. 4A and 4B show cross-sectional side views of an example extendable body 480 of a flood warning apparatus according to certain example embodiments. Specifically, FIG. 4A shows a cross-sectional view of the extendable body 480 at its minimum height 481, and FIG. 4B shows a cross-sectional view of the extendable body 480 at its maximum height 581. Referring to the description above with respect to FIGS. 1A through 3, the extendable body 480 of FIGS. 4A and 4B is an example of the extendable body 280 discussed above with respect to FIG. 2.

In this case, the extendable body 480 of FIGS. 4A and 4B has multiple segments 485 that are configured to move with respect to each other to allow the extendable body 480 to move between its minimum height 481 (as shown in FIG. 4A) and its maximum height 581 (as shown in FIG. 4B). Under this configuration, the extendable body 480 may have one or more (e.g., 2, 3, 4, 5, 8, 10, 15, 25) of segments 485. In this example, the extendable body 480 has four segments 485 (segment 485-1, segment 485-2, segment 485-3, and segment 485-4). In this case, each segment 485 has substantially the same height (which is substantially the same as the minimum height 481). In alternative embodiments, the height of one or more segments 485 may be different than the height of one or more of the other segments 485.

Each segment 485 has one or more walls 489 that define the height 481 of the segment 485. The one or more walls 489 of each segment 485 form a shape when viewed from above. Examples of such a shape may include, but are not limited to, a circle (as in this case), a square, a triangle, and an oval. In certain example embodiments, as in this case, the shape when viewed from above of each segment 485 is the same as each other. In alternative embodiments, the shape when viewed from above of one segment 485 may be different than the shape when viewed from above of one or more of the other segments 485, provided that the difference in shapes does not inhibit the ability of the segments 485 to move relative to each other so that the height of the extendable body 480 may change, directly or indirectly, with a change in surrounding water level.

Also in this case, the wall 489 of each segment 485 has a different diameter (e.g., inner diameter, outer diameter). Specifically, the wall 489-1 of segment 485-1 has an outer diameter 428-1 and an inner diameter 429-1. The wall 489-2 of segment 485-2 has an outer diameter 428-2 and an inner diameter 429-2. The wall 489-3 of segment 485-3 has an outer diameter 428-3 and an inner diameter 429-3. The wall 489-4 of segment 485-4 has an outer diameter 428-4 and an inner diameter 429-4. The inner diameter 429-1 of the wall 489-1 of segment 485-1 is greater than the outer diameter 428-2 of the wall 489-2 of segment 485-2. The inner diameter 429-2 of the wall 489-2 of segment 485-2 is greater than the outer diameter 428-3 of the wall 489-3 of segment 485-3. The inner diameter 429-3 of the wall 489-3 of segment 485-3 is greater than the outer diameter 428-4 of the wall 489-4 of segment 485-4.

The multiple segments 485 may have one or more configurations to allow the height of the extendable body 480 to be adjusted within the range 452 between the minimum height over an extended period of time (e.g., a year, 5 years, 10 years, 25 years, 50 years). In this case, each segment 485 has an outward extension 486 (e.g., flange) that extends laterally away from the proximal (bottom) end of the wall 489 and an inward extension 488 (e.g., flange) that extends laterally away from the distal (top) end of the wall 489. Specifically, the wall 489-1 of segment 485-1 has an outward extension 486-1 at its proximal end and an inward extension 488-1 at its distal end. The wall 489-2 of segment 485-2 has an outward extension 486-2 at its proximal end and an inward extension 488-2 at its distal end. The wall 489-3 of segment 485-3 has an outward extension 486-3 at its proximal end and an inward extension 488-3 at its distal end. The wall 489-4 of segment 485-4 has an outward extension 486-4 at its proximal end and an inward extension 488-4 at its distal end.

In this example, the inward extension 488-1 of segment 485-1 is configured to extend inward to abut against (or nearly abut against) the outer surface of the wall 489-2 of segment 485-2. In addition, the outward extension 486-2 of segment 485-2 is configured to extend inward to abut against (or nearly abut against) the inner surface of the wall 489-1 of segment 485-1. The height of the combination of segment 485-1 and segment 485-2 is at a maximum when the inward extension 488-1 of segment 485-1 abuts against the outward extension 486-2 of segment 485-2, as shown in FIG. 4B.

In addition, in this example, the inward extension 488-2 of segment 485-2 is configured to extend inward to abut against (or nearly abut against) the outer surface of the wall 489-3 of segment 485-3. In addition, the outward extension 486-3 of segment 485-3 is configured to extend inward to abut against (or nearly abut against) the inner surface of the wall 489-2 of segment 485-2. The height of the combination of segment 485-2 and segment 485-3 is at a maximum when the inward extension 488-2 of segment 485-2 abuts against the outward extension 486-3 of segment 485-3, as shown in FIG. 4B.

Further, in this example, the inward extension 488-3 of segment 485-3 is configured to extend inward to abut against (or nearly abut against) the outer surface of the wall 489-4 of segment 485-4. In addition, the outward extension 486-4 of segment 485-4 is configured to extend inward to abut against (or nearly abut against) the inner surface of the wall 489-3 of segment 485-3. The height of the combination of segment 485-3 and segment 485-4 is at a maximum when the inward extension 488-3 of segment 485-3 abuts against the outward extension 486-4 of segment 485-4, as shown in FIG. 4B.

The extendable body 480 reaches its maximum height 581 when the inward extension 488-1 of segment 485-1 abuts against the outward extension 486-2 of segment 485-2, the inward extension 488-2 of segment 485-2 abuts against the outward extension 486-3 of segment 485-3, and the inward extension 488-3 of segment 485-3 abuts against the outward extension 486-4 of segment 485-4, as shown in FIG. 4B. In certain example embodiments, the various inward extensions 488 and outward extensions 486 are strong enough to remain intact when abutting against each other and overcome an upward force imposed by the buoyancy of the platform (e.g., platform 270, platform 370) when the flood warning apparatus (e.g., flood warning apparatus 200) is submerged in water (e.g., water 112) and the extendable body 480 is at its maximum height 581.

While not shown in FIGS. 4A and 4B, one or more of the inward extensions 488 and/or one or more of the outward extensions 486 may include one or more features (e.g., channels, slots, recesses) that allow one or more sealing members (e.g., gaskets, O-rings) to be placed therein. In such cases, the sealing members may provide a complete or substantial fluidic seal that prevents or substantially prevents fluids (e.g., water) from flowing therethrough when the sealing member abuts against an adjacent segment 485. Considerations such as tolerances, size of the sealing members, etc. may be engineered so that the sealing members provide a substantially fluidic seal without substantially interfering with the movement of one segment 485 relative to another segment 485.

In certain example embodiments, the extendable body 480 may include one or more of a number of coupling features 419 (e.g., threaded apertures, slots, tabs, clips, a bottom surface for welding, a snap fitting). For example, as shown in FIGS. 4A and 4B, the extendable body 480 may have one or more coupling features 419 disposed at the top of the wall 489-4 and/or in the inward extension 488-4 of segment 485-4. In such a case, the coupling features 419 may be configured to complement the coupling features (e.g., coupling features 319) of the platform (e.g., platform 270, platform 370) so that the platform and the extendable body 480 may be directly or indirectly coupled to each other.

As another example, as shown in FIGS. 4A and 4B, the extendable body 480 may have one or more coupling features 419 disposed at the bottom of the wall 489-1 and/or in the outward extension 486-1 of segment 485-1. In such a case, the coupling features 419 may be configured to complement one or more coupling features (e.g., rebar, holes) in the foundation (e.g., foundation 240) so that the foundation and the extendable body 480 may be directly or indirectly coupled to each other.

Some or all of the extendable body 480 may be made of one or more of a number of materials (e.g., steel, a composite, nylon, rock) that has no buoyancy. In some cases, some (e.g., the top portion) or all of the wall 489-4 of segment 485-4 is made of a material that is buoyant in water. In addition, such materials may be configured to be located in a varied outdoor environment (e.g., high humidity, dry conditions, extreme heat, extreme cold, submerged in water) for an extended period of time (e.g., a year, 5 years, 10 years, 25 years, 50 years) without deterioration to the extent that the extendable body 480 would be unable to change its height with a change in surrounding water level.

Figure 5:
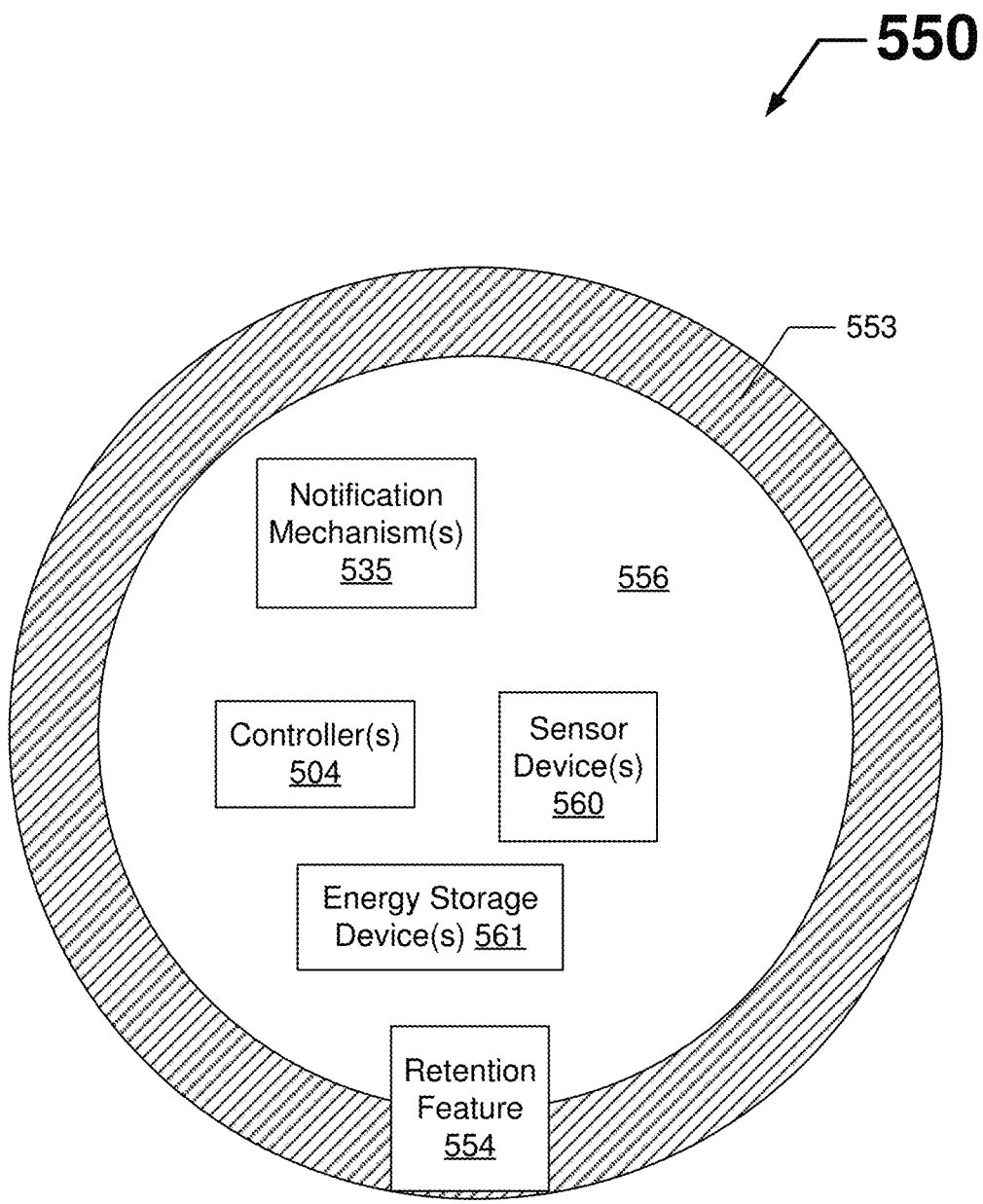
FIG. 5 shows a cross-sectional side view of an example floatation object of a flood warning apparatus according to certain example embodiments.

FIG. 5 shows a cross-sectional side view of an example floatation object 550 of a flood warning apparatus according to certain example embodiments. Referring to the description above with respect to FIGS. 1A through 4, the floatation object 550 of FIG. 5 is an example of the floatation objects 250 discussed above with respect to FIG. 2. The floatation object 550 of FIG. 5 has one or more walls 553 that form a cavity 556 that is enclosed. The one or more walls 553 form a three-dimensional shape (e.g., a sphere, a cube, a pyramid).

In certain example embodiments, the shape formed by the one or more walls 553 of the floatation object 550 has no corners or edges, or rounded corners and/or edges, to reduce the risk that the floatation object 550 will be captured in debris that prevents the floatation object 550 from being carried downstream by the water (e.g., water 112) when the floating object 550 is released from the platform (e.g., platform 270, platform 370). Further, the one or more walls 553 of the floatation object 550 may be made of one or more of a number of materials that provide buoyancy to the floatation object 550 so that the floatation object 550 floats in water (e.g., water 112) . . . . Examples of such materials may include, but are not limited to, plastic, polyethylene, polypropylene, hard foam, a composite, a polymer, and a ceramic material.

The floatation object 550 includes multiple components that are positioned, at least in part, in the cavity 556 formed by the one or more walls 553. In this case, the floatation object 550 includes one or more controllers 504, one or more sensor devices 560, one or more energy storage devices 561, a retention feature 554, and one or more notification mechanisms 535. A sensor device 560 of the floatation object 550 may be integrated with and/or coupled one or more of the walls 553 of the floatation object 550. A sensor device 560 of the floatation object 550 includes one or more sensors that measure one or more parameters (e.g., pressure, speed, position, temperature, humidity, height, ambient light). Examples of a sensor of a sensor device 560 may include, but are not limited to, a temperature sensor, an accelerometer, flow sensor, a pressure sensor, a global positioning sensor, a load cell, and a camera. A sensor device 560 may measure one or more parameters at a time with respect to the floatation object 550.

For example, a sensor device 560 may be configured to measure a parameter (e.g., floatation, speed, movement away from the platform (e.g., platform 270, platform 370), height, position) after the floatation object 550 exits the platform. In this way, the measurement of the parameter may indicate whether the floatation object 550 was dislodged from the platform by a high water event (and so warranting the activation of one or more of the notification mechanisms 535) or by some other cause (e.g., excessive winds) that would not warrant the activation of one or more of the notification mechanisms 535. As another example, a sensor device 560 may be configured to measure the ambient temperature. As yet another example, a sensor device 560 may be configured to measure the ambient humidity. As another example, a sensor device 560 may be configured to measure a parameter associated with whether the retention feature 554 is engaged with a retention feature (e.g., retention feature 373) of a platform (e.g., platform 270, platform 370).

A sensor device 560 may measure a parameter continuously, periodically (e.g., every 10 minutes, every hour), upon the occurrence of an event (e.g., the retention feature 554 is disengaged from a retention feature (e.g., retention feature 373) of a platform (e.g., platform 270, platform 370), the floatation object 550 has a velocity for a sustained period of time (e.g., 10 seconds, a minute), the position of the floatation object 550 changes by at least 30 feet), and/or based on some other factor. A sensor device 560 of the flotation object 550 may be substantially the same as a sensor device 660 of FIG. 6. Some or all of the details of a sensor device 660 discussed below with respect to FIG. 6 may apply to a sensor device 560 of the floatation object 550 of FIG. 5.

A controller 504 of the floatation object 550 may be configured to communicate with each of the sensor devices 560 of the floatation object 550. In this way, a controller 504 of the floatation object 550 may control the operation of one or more of the sensor devices 560 and/or receive measurements made by the sensor devices 560. A controller 504 may also be configured to process and/or use (e.g., in a model) the measurements received from the sensor devices 560. In some cases, a controller 504 of the floatation object 550 may be configured to communicate with one or more other components and/or entities (e.g., a user system, another controller 504 of the floatation object 550, a retention feature 554 of the floatation object 550, a controller of a platform (e.g., platform 370)). The floatation object 550 may have one or more (e.g., 0, 1, 2, 3, 5, 10) controllers 504.

A controller 504 of the floatation object 550 may be substantially the same as a controller 604 of FIG. 6. Some or all of the details of a controller 604 discussed below with respect to FIG. 6 may apply to a controller 504 of the floatation object 550 of FIG. 5. For example, a controller 504 of the floatation object 550 may be configured to include a transceiver (e.g., a receiver, a transmitter) and a communication module in order to communicate conditions (e.g., current position, whether the floatation object 550 is floating in water (e.g., water 112), charge level of the energy storage devices 561) about the floatation object 550 (including one or more of its components) with a user system of a user (also discussed below with respect to FIG. 6). In such communications, the floatation object 550 may be identified by a unique identification number.

The floatation object 550 may include one or more (e.g., 0, 1, 2, 3, 5, 10) energy storage devices 561. Each energy storage device 561 is designed to provide power of the type (e.g., alternating current, direct current) and level (e.g., 12V, 120V, 24V) that is required by one or more other components of the floatation object 550. An energy storage device 561 may be or include one or more types of electrical storage component, including but not limited to a battery, a supercapacitor, and a fuel cell. An energy storage device 561 may include one or more of a number of other components needed to perform its functions, including but not limited to a switch, an inverter, a converter, an electrical cable, a resistor, a capacitor, a diode, a transformer, and a protective relay.

In some cases, an energy storage device 561 may be rechargeable. In such a case, an energy storage device 561 may include a solar panel that is mounted on and/or integrated with a wall 553 of the floatation object 550 to allow the solar panel to be exposed to solar radiation in the environment. Those of ordinary skill in the art will appreciate that other types of technology, whether currently existing or developed in the future, may be used to recharge an energy storage device 561 of the floatation object 550. Similarly, an energy storage device 561 may take the form of a technology that is developed in the future.

The controller 504, the sensor devices 560, and the energy storage devices 561 allow the floatation object 550 to receive instructions and/or send information regarding its functionality and operation. For example, when a sensor device 560 is a GPS and when the controller 504 includes a transmitter (or a transceiver), the floatation object 550 may send its current position during a flood event while the floatation object 550 is floating in the water down a waterway experiencing high water. As another example, the controller 504 may receive an instruction from a user (including an associated user system) to operate a notification mechanism 535 for a 15 second test while the floatation object 550 is secured in a platform (e.g., platform 370) by a retention feature (e.g., retention feature 373) of the platform.

The floatation object 550 includes one or more (e.g., 1, 2, 3, 5, 8, 10) retention features 554. In this case, there is a single retention feature 554. The retention feature 554 is configured to keep the floatation object 550 retained by a retention feature (e.g., retention feature 373) of a platform (e.g., platform 370) until a condition (e.g., the platform 370 is entirely submerged in water, when the extendable body (e.g., extendable body 280) exceeds a certain height within the range (e.g., range 252)) arises that causes the retention feature 554 to release and fully activate the floatation object 550. While a floatation object 550 is retained using the retention feature 554, the floatation object 550 may be at least partially deactivated (e.g., some or all of the notification mechanisms 535 are deactivated).

The retention feature 554 of the floatation object 550 may have one or more configurations using one or more components. For example, the retention feature 554 may be or include one or more magnets that are subject to magnetic forces imposed by a retention feature (e.g., retention feature 373) of a platform to retain the floatation object 550. In such a case, when the waterline (e.g., waterline 111) exceeds a certain height (e.g., above the height 371 of the platform 370), the buoyancy of the floatation object 550 overcomes the magnetic attraction of the magnetic field of the retention feature (e.g., retention feature 373) of the platform (e.g., platform 370) on the retention feature 554 (e.g., a magnet) of the floatation object 550, allowing the floatation object 550 to be released. As the magnetic field experienced by the retention feature 554 fades and eventually disappears as the floatation object 550 separates and moves further away from the retention feature of the platform, some or all of the notification mechanisms 535 of the floatation object 550 may fully activate.

A retention feature 554 of the floatation object 550 may operate electrically, mechanically, electromechanically, magnetically, electromagnetically, hydraulically, pneumatically, and/or using another means of retention of a platform (e.g., platform 370) in a way that complements the configuration of the retention feature (e.g., retention feature 373) of the platform. When the retention feature 554 requires power to operate, the power may be supplied by one or more of the energy storage devices 561. When a retention feature 554 requires control to operate, the control may be supplied by one or more of the controllers 504. When a retention feature 554 requires a measurement of a parameter to operate, the measurement may be supplied by one or more of the sensor devices 560.

Each notification mechanism 535 of the floatation object 550 is configured to broadcast some type of notification (e.g., a high water alert notification) as to a condition associated with the floatation object 550 and/or a high water event. Examples of a notification mechanism 535 may vary, depending on factors such as the location, terrain, local customs, and/or other applicable conditions. For example, a notification mechanism 535 may be or include a speaker that broadcasts an alarm and/or other message about a high water event after the floatation object 550 is released from a platform (e.g., platform 370) of an example flood warning apparatus (e.g., flood warning apparatus 200) and is floating in water (e.g., water 112). As another example, a notification mechanism 535 may be or include one or more light sources that emit visible light after the floatation object 550 is separated from a platform of an example flood warning apparatus and is floating in water, Each notification mechanism 535 may be designed to broadcast its announcement over a large area (e.g., within 100 feet, within 1000 feet, within a half mile, within a mile) relative to its current location. The operation of a notification mechanism 535 may be triggered and/or otherwise controlled by a controller 504, one or more sensor devices 560, and/or one or more energy storage devices 561. For example, a sensor device 560, powered by an energy storage device 561, may measure a parameter associated with the retention feature 554 being released from the platform (e.g., platform 270). When this occurs, and when the same or another sensor device 560 measures a parameter associated with the floatation object 550 floating in water (e.g., water 112) and/or being a minimum distance (e.g., 5 feet, 10 feet, 50 feet) from the platform, a controller 504, also powered by an energy storage device 561), may activate and control the operation of one or more notification mechanisms 535.

For instance, if a notification mechanism 535 includes a speaker that is configured to broadcast a sound and/or a message at an elevated volume (e.g., 100 decibels, 130 decibels, 150 decibels), when a controller 504 determines that a dangerous high water condition exists based on the measurements made by one or more of the sensor devices 560, the controller 504 may direct the recording and/or warning sound to the speaker while also controlling the volume. In addition, or in the alternative, if a notification mechanism 535 includes one or more light sources that configured to emit a flashing strobe of light of a high lumen amount (e.g., 1000 lumens, 2500 lumens, 4000 lumens), when a controller 504 determines that a dangerous high water condition exists based on the measurements made by one or more of the sensor devices 560, the controller 504 may operate the light source.

Figure 6A:
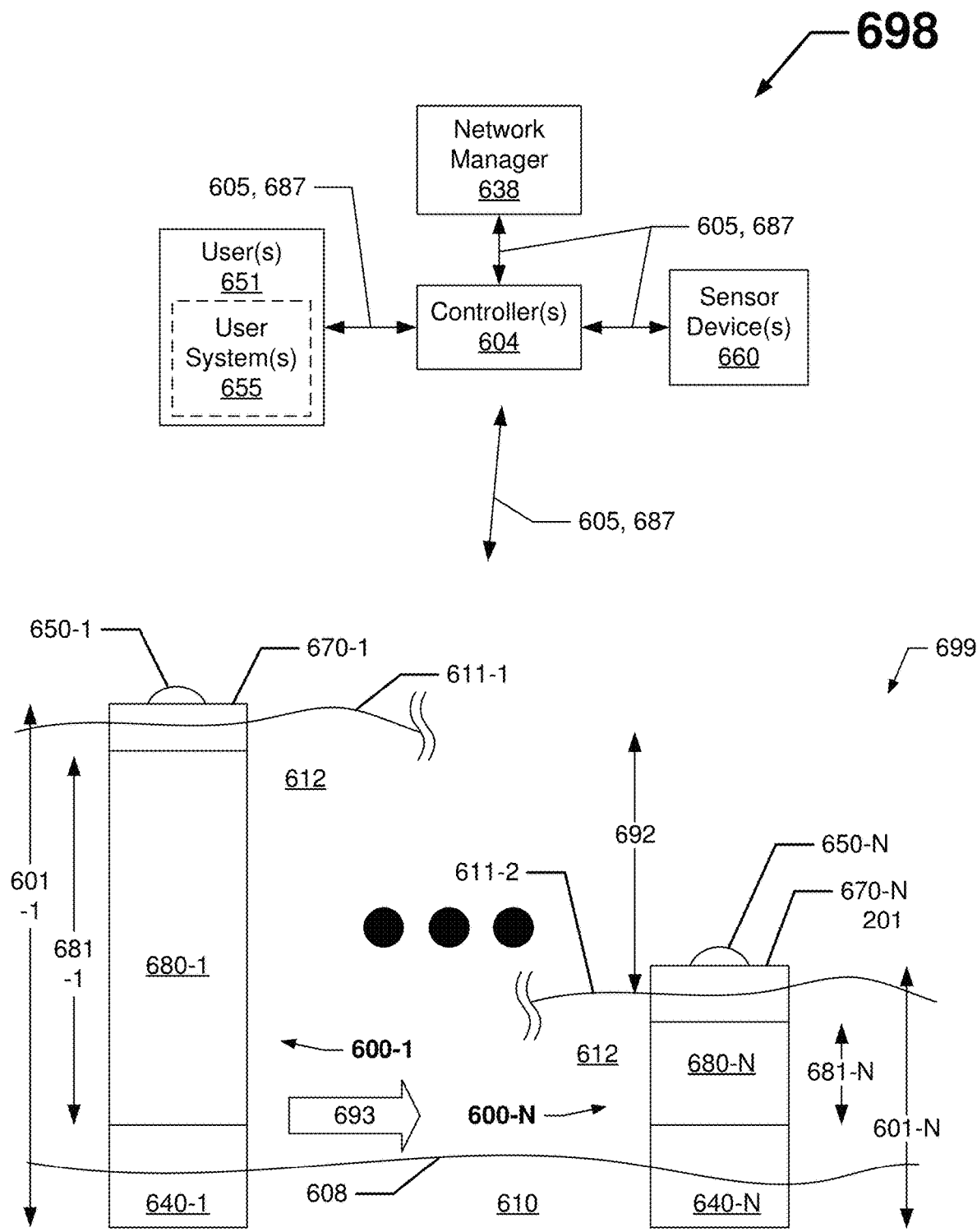
FIGS. 6A and 6B show a diagram of a system for providing a flood warning notification according to certain example embodiments.
Figure 6B:
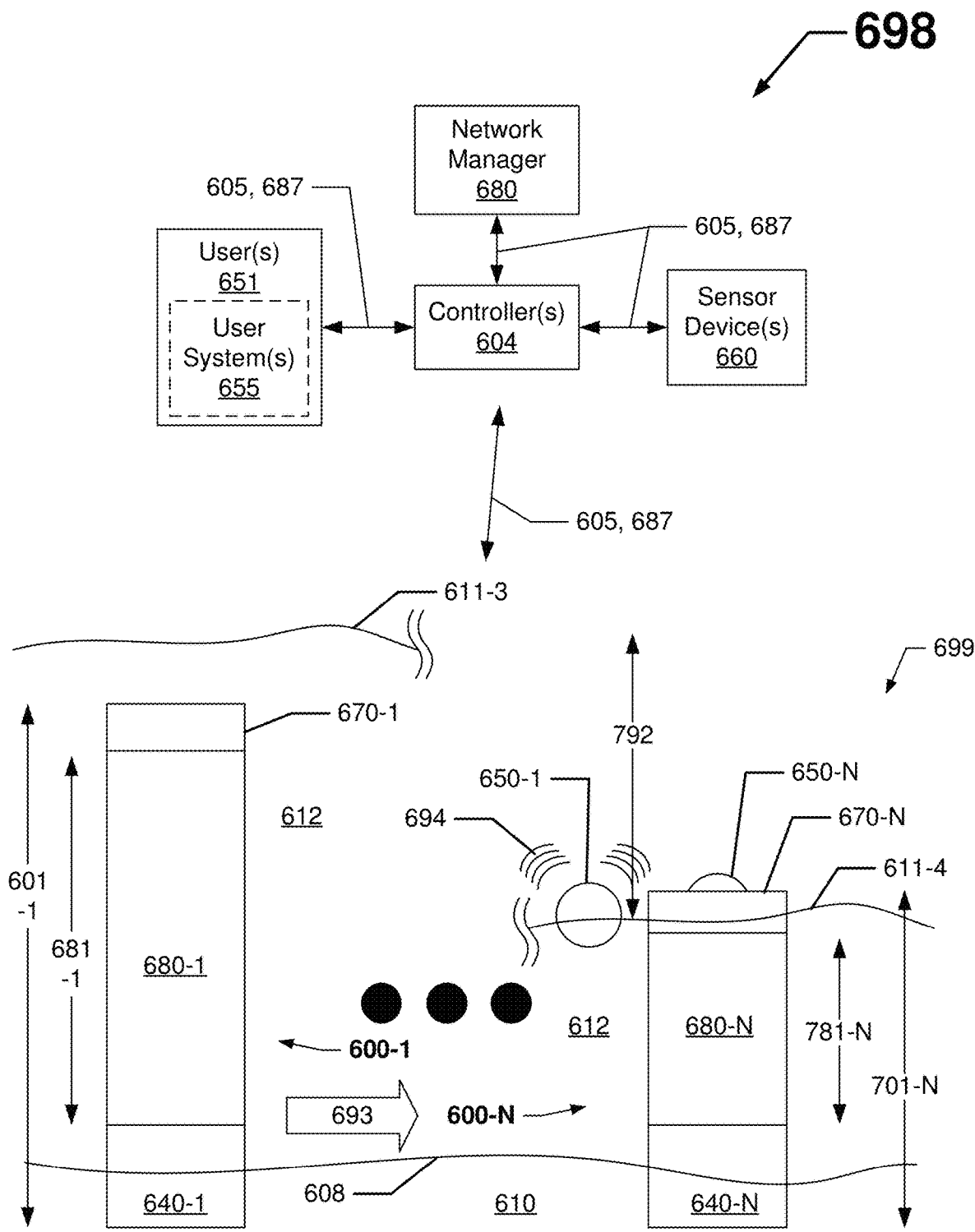

FIGS. 6A and 6B show a diagram of a system 698 for providing a flood warning notification according to certain example embodiments. Specifically, FIG. 6A shows the system 698 at a point in time. FIG. 6B shows the system 698 at a subsequent point in time relative to the time captured in FIG. 6A. Referring to the description above with respect to FIGS. 1A through 5, the system 698 of FIGS. 6A and 6B includes one or more flood warning apparatuses 600, a waterway 699, one or more controllers 604, one or more sensor devices 660, one or more users 651 (including one or more optional user systems 655), and a network manager 638. The components shown in FIGS. 6A and 6B are not exhaustive, and in some embodiments, one or more of the components shown in FIGS. 6A and 6B may not be included in the system 698, including portions thereof.

A component of the system 698 may be discrete or combined with one or more other components of the system 698. Also, one or more components of the system 698 may have different configurations. For example, one or more sensor devices 660 may be disposed within or disposed on other components (e.g., the platform 670-1 of the flood warning apparatus 600-1, the floatation object 650-X of the flood warning apparatus 600-X). As another example, a controller 604, rather than being a stand-alone device, may be part of one or more other components (e.g., the floatation object 650-X of the flood warning apparatus 600-X) of the system 698.

The waterway 699 of the system 698 may be substantially the same as the waterway 199 discussed above with respect to FIGS. 1A through 1C. For example, the waterway 699 of FIGS. 6A and 6B has a ground 608 at the top of the Earth 610. In this case, at the point in time captured in FIGS. 6A and 6B, the ground 608 is in the form of a riverbed because the ground is under water 612. There is a waterline 611 that defines the top of the water 612 above the ground 608.

The length of the waterway 699 may be a distance (e.g., 5 miles, 20 miles, 100 miles, 500 miles, 1000 miles). The flow 693 of the waterway 699 in this case is from where flood warning apparatus 600-1 is located to where flood warning apparatus 600-N is located. In some cases (e.g., during flood events), as in this example, there may be a significant difference in the waterline 611 along the length of the waterway 699. For example, at the point in time captured in FIG. 6A, there is a difference 692 (e.g., in feet, in meters) between the level of the waterline 611-1 where flood warning apparatus 600-1 is positioned in the waterway 699 and the level of the waterline 611-2 where flood warning apparatus 600-N is positioned (e.g., 5 miles downstream) in the waterway 699.

Similarly, at the point in time captured in FIG. 6B, there is a difference 792 between the level of the waterline 611-3 (elevated compared to the level of the waterline 611-1 of FIG. 6A) where flood warning apparatus 600-1 is positioned in the waterway 699 and the level of the waterline 611-4 (elevated compared to the level of the waterline 611-1 of FIG. 6A) where flood warning apparatus 600-N is positioned in the waterway 699. This is a common phenomenon in flood events, where it takes time for flood waters upstream to reach downstream. While the rise in water levels may be rapid in extreme situations, it is not immediate.

The system 698 of FIGS. 6A and 6B includes N (e.g., 2, 5, 22, 100, 300, 500, 1000) flood warning apparatuses 600 (flood warning apparatus 600-1 through flood warning apparatus 600-N). Adjacent flood warning apparatuses 600 may be separated by a distance (e.g., 100 feet, 500 feet, 1000 feet, a mile, 5 miles, 15 miles, 50 miles, 100 miles). The distance between adjacent flood warning apparatuses 600 may be based on one or more factors, including but not limited to population density, terrain, path of the waterway, changes in elevation, and accessibility.

Each flood warning apparatus 600 of the system 698 includes a foundation 640, an extendable body 680, a platform 670, and a floatation object 650. For example, flood warning apparatus 600-1 of the system 698 includes a foundation 640-1, an extendable body 680-1, a platform 670-1, and a floatation object 650-1. As another example, flood warning apparatus 600-N of the system 698 includes a foundation 640-N, an extendable body 680-N, a platform 670-N, and a floatation object 650-N. Each foundation 640, extendable body 680, platform 670, and floatation object 650 may be substantially the same as the foundation 240, the extendable bodies, the platforms, and the floatation objects discussed above with respect to FIGS. 2 through 5.

At the point in time captured in FIG. 6A, flood warning apparatus 600-1 is at is maximum height 601-1, which means that the extendable body 680-1 is also at its maximum height 681-1. The waterline 611-1 at the location of the flood warning apparatus 600-1 is at the platform 670-1, and so the floatation object 650-1 is still retained (e.g., by the retention feature (e.g., retention feature 373) of the platform 670-1 and the retention feature (e.g., retention feature 554) of the floatation object 650-1) within the platform 670-1.

In addition, at the point in time captured in FIG. 6A, flood warning apparatus 600-N is at or near its minimum height 601-N, which means that the extendable body 680-1 is also at or near its minimum height 681-N. The waterline 611-2 at the location of the flood warning apparatus 600-N is at the platform 670-N, and so the floatation object 650-N is still retained (e.g., by the retention feature (e.g., retention feature 373) of the platform 670-N and the retention feature (e.g., retention feature 554) of the floatation object 650-N) within the platform 670-N. There is a significant difference 692 between the level of the waterline 611-1 and the level of the waterline 611-2.

At the point in time captured in FIG. 6B, the level of the waterline 611-3 is elevated compared to the level of the waterline 611-1 at the location of the flood warning apparatus 600-1. In this case, the waterline is above the platform 670-1. Since the platform 670-1 is buoyant, the flood warning apparatus 600-1 remains at its maximum height 601-1, which means that the extendable body 680-1 also remains at its maximum height 681-1, as the flood warning apparatus 600-1 is submerged in the water 612. In addition, due to this elevation of the waterline 611-3 relative to the platform 70-1 at the location of the flood warning apparatus 600-1, the flotation object 650-1 has been released from the platform 670-1 and activated (e.g., broadcasts an alert notification 694). Because the floatation object 650-1 is buoyant, the floatation object 650-1 floats downstream.

At the point in time captured in FIG. 6B, the floatation object 650-1 is in the location where the flood warning apparatus 600-N is located. While the level of the waterline 611-4 at the flood warning apparatus 600-N has risen relative to the level of the waterline 611-2 in FIG. 6B, the difference 792 between the level of the waterline 611-3 and the level of the waterline 611-4 is still significant. Specifically, while the level of the waterline 611-4 has risen relative to the level of the waterline 611-2, the height 701-N of the flood warning apparatus 600-N, and so also the height 781-N of the extendable body 680-N, are less than their maximum heights. The height 701-N of the flood warning apparatus 600-N, and so also the height 781-N of the extendable body 680-N, has risen relative to what they show in FIG. 6A because the platform 670-N, which is buoyant, remains floating at the waterline 611-4. As the waterline 611-4 rises, the buoyant force of the platform 670-N lifts the extendable body 680-N.

In this scenario, there will be a point in the future relative to the time captured in FIG. 6B where the location of the flood warning apparatus 600-N will have an even further increase in the level of the waterline 611, possibly at least as great as the level of the waterline 611-3 where the flood warning apparatus 600-1 at the time captured in FIG. 6B. In this way, the floatation object 650-1 is able to broadcast its alert notification 694 (e.g., a loud siren, a bright flashing strobe) to people downstream in and adjacent to the waterway 699 to provide early, real time warning. Implementation of example embodiments to provide warning of an imminent flooding event is not reliant on people, cell phone coverage, overridden messaging, message fatigue, and the like.

The system 698 may include one or more controllers 604. A controller 604 of the system 698 communicates with and in some cases controls one or more of the other components (e.g., a sensor device 660, another controller 604, an energy storage device (e.g., energy storage device 561), a notification mechanism (e.g., notification mechanism 535)) of the system 698. A controller 604 performs a number of functions that include obtaining and sending data, evaluating data, following protocols, running algorithms, and sending commands. A controller 604 may include one or more of a number of components. As discussed below with respect to FIG. 7, such components of a controller 604 may include, but are not limited to, a control engine, a communication module, a timer, a counter, a power module, a storage repository, a hardware processor, memory, a transceiver, an application interface, and a security module.

When there are multiple controllers 604 (e.g., one controller 604 for the platform 670-1, another controller 604 for the floatation object 650-1, yet another controller 604 for the floatation object 650-N), each controller 604 may operate independently of each other. Alternatively, one or more of the controllers 604 may work cooperatively with each other. As yet another alternative, one of the controllers 604 may control some or all of one or more other controllers 604 in the system 698. Each controller 604 may be considered a type of computer device, as discussed below with respect to FIG. 8.

Each sensor device 660 includes one or more sensors that measure one or more parameters (e.g., pressure, flow rate, temperature, humidity, rainfall, rain forecasts, height, position, buoyancy, movement (e.g., of an object), charge level, voltage, current). Examples of a sensor of a sensor device 660 may include, but are not limited to, a temperature sensor, a flow sensor, a pressure sensor, a gyroscope, a voltmeter, an ammeter, an accelerometer, a global positioning sensor, a buoyancy sensor, a rain gauge, a weather satellite radar, and a camera. A sensor device 660 may be an independent component of the system 698 or may be integrated with one or more components (e.g., a floatation object 650, a platform 670) of the system 698, including one or more of the flood warning apparatuses 600.

A sensor device 660 may measure one or more parameters at one or more locations within the system 698. For example, a sensor device 660 of a platform 670 of a flood warning apparatus 600 may be configured to measure the height of the platform 670. As another example, a sensor device 660 of a platform 670 of a flood warning apparatus 600 may be configured to measure whether a retention feature (e.g., retention feature 373) of the platform 670 is currently securing a floatation object 650. As another example, a sensor device 660 of a platform 670 of a flood warning apparatus 600 may be configured to measure a level of charge of one or more energy storage devices (e.g., energy storage devices 361) of a platform 670.

As another example, a sensor device 660 of a platform 670 of a flood warning apparatus 600 may be configured to measure the presence of a floatation object 650 within the cavity (e.g., cavity 375) of the platform 670. As yet another example, a sensor device 660 of a platform 670 of a flood warning apparatus 600 may be configured to detect if there are foreign objects (e.g., a branch, fallen leaves) within the cavity (e.g., cavity 375) of the platform (e.g., platform 370) that may need to be removed in order for the one or more floatation objects (e.g., floatation objects 250) to be released and activated properly when the appropriate conditions arise.

As another example, a sensor device 660 of a floatation object 650 of a flood warning apparatus 600 may be configured to measure whether a retention feature (e.g., retention feature 554) of the floatation object 650 is secured by a retention feature (e.g., retention feature 373) of the platform 670. As another example, a sensor device 660 of a floatation object 650 of a flood warning apparatus 600 may be configured to measure a position (e.g., using GPS coordinates) of the platform 670. As another example, a sensor device 660 of a floatation object 650 of a flood warning apparatus 600 may be configured to measure a height of the floatation object 650. As another example, a sensor device 660 of a floatation object 650 of a flood warning apparatus 600 may be configured to measure a level of charge of one or more energy storage devices (e.g., energy storage devices 561) of floatation object 650.

As another example, a sensor device 660 of a floatation object 650 of a flood warning apparatus 600 may be configured to measure buoyancy to indicate whether the floatation object 650 is floating in the water 612. As another example, a sensor device 660 of a floatation object 650 of a flood warning apparatus 600 may be configured to measure a parameter (e.g., voltage, current) associated with whether a notification mechanism 535 has been activated. As another example, a sensor device 660 of a floatation object 650 of a flood warning apparatus 600 may be configured to measure a parameter (e.g., volume, light) associated with whether a notification mechanism 535 is broadcasting a high water alert notification 694.

In some cases, a number of sensor devices 660, each measuring a different parameter, may be used in combination to determine and confirm whether a controller 604 should take a particular action (e.g., send a communication signal to a user system 655, change the output level of a notification mechanism (e.g., notification mechanism 535)). When a sensor device 660 includes its own controller 604 (or portions thereof), then the sensor device 660 may be considered a type of computer device, as discussed below with respect to FIG. 8.

A user 651 may be a person or entity that interacts, directly or indirectly, with a controller 604 and/or one or more other components of the system 698. Examples of a user 651 may include, but are not limited to, a business owner, a government official, a research scientist, an engineer, a company representative, a geologist, a consultant, an aid worker, a contractor, an employee, and a manufacturer's representative. A user 651 may use one or more user systems 655, which may include a display (e.g., a GUI). A user system 655 of a user 651 may interact with (e.g., send data to, obtain data from) a controller 604 via an application interface and using the communication links 605. A user 651 may also interact directly with a controller 604 through a user interface (e.g., keyboard, mouse, touchscreen).

In certain example embodiments, a user 651 (through a user system 655) may communicate with and collect information from (e.g., continuously, periodically, upon the occurrence of an event or condition) one or more platforms 670 and/or one or more floatation objects 650 that are located in the waterway 699. For example, a user system 655 may communicate with all N platforms 670 and all N floatation objects 650 that are located in the waterway 699. In such a case, the user system 655 may evaluate the information (e.g., height of each platform 670, whether a floatation object 670 is retained by a retention feature of a platform 670, whether a floatation object 670 is activated, the GPS coordinates of the floatation objects 670) received from the platforms 670 and/or floatation objects 650 to ascertain conditions in the waterway 699 in real time. The information received by a user system 655 from a floatation object 650 may be sent by a controller (e.g., controller 504) and/or a notification mechanism (e.g., notification mechanism 535) of the floatation object 650.

During a flood event (e.g., actually occurring, forecast as likely to be imminent) in the waterway 699, the user system 655 may be able to use the information provided by the platforms 670 and/or the floatation objects 650 as inputs to one or more algorithms 733 (e.g., models), the outputs of which may dictate (e.g., using a protocol 732) that the user system 655 (or a user 651 thereof) communicate and/or coordinate with particular local entities (e.g., county judges, emergency management agencies and/or personnel, local businesses) in real time. The combination of a user 651 (including an associated user system 655) and some or all of the N flood warning apparatuses 600, including communication capabilities therebetween, may constitute a real time flood event coordination system herein.

For example, a user system 655 that is communicably coupled to one or more of the floatation objects 650 of the flood warning apparatuses 600 in the system 698 may be configured to generate and send a notification about a flood event in the waterway 699 based on the notification mechanism (e.g., notification mechanism 535) of at least one floatation object 650 being activated. As another example, a user system 655 may be configured to generate and send a forecast of an imminent flood event in the waterway 699 based on information received from at least one platform 670 and/or at least one floatation object 650 in the system 698 before the notification mechanism (e.g., notification mechanism 535) of the floatation object 650 is activated.

The network manager 638 is a device or component that controls all or a portion (e.g., a communication network, a controller 604) of the system 698. The network manager 638 may be substantially similar to a controller 604, as described above. For example, the network manager 638 may include a controller that has one or more components and/or similar functionality to some or all of a controller 604. Alternatively, the network manager 638 may include one or more of a number of features in addition to, or altered from, the features of a controller 604. As described herein, control and/or communication with the network manager 638 may include communicating with one or more other components of the same system 698 or another system. In such a case, the network manager 638 may facilitate such control and/or communication. The network manager 638 may be called by other names, including but not limited to a master controller, a network controller, and an enterprise manager. The network manager 638 may be considered a type of computer device, as discussed below with respect to FIG. 8.

Interaction between each controller 604, the sensor devices 660, the users 651 (including one or more associated user systems 655), the network manager 638, and one or more other components (e.g., an energy storage device, a notification mechanism) of the system 698 may be conducted using communication links 605 and/or power transfer links 687. Each communication link 605 may include wired (e.g., Class 1 electrical cables, Class 2 electrical cables, electrical connectors, Power Line Carrier, RS485) and/or wireless (e.g., Wi-Fi, Zigbee, visible light communication, cellular networking, satellite, Bluetooth, Bluetooth Low Energy (BLE), ultrawide band (UWB), WirelessHART, ISA100) technology. A communication link 605 may transmit signals (e.g., communication signals, control signals, data) between each controller 604, the sensor devices 660, the users 651 (including one or more associated user systems 655), the network manager 638, and the other components of the system 698.

Each power transfer link 687 may include one or more electrical conductors, which may be individual or part of one or more electrical cables. In some cases, as with inductive power, power may be transferred wirelessly using power transfer links 687. A power transfer link 687 may transmit power between each controller 604, the sensor devices 660, the users 651 (including one or more associated user systems 655), the network manager 638, and the other components of the system 698. Each power transfer link 687 may be sized (e.g., 12 gauge, 18 gauge, 4 gauge) in a manner suitable for the amount (e.g., 480V, 24V, 120V) and type (e.g., alternating current, direct current) of power transferred therethrough.

Figure 7:
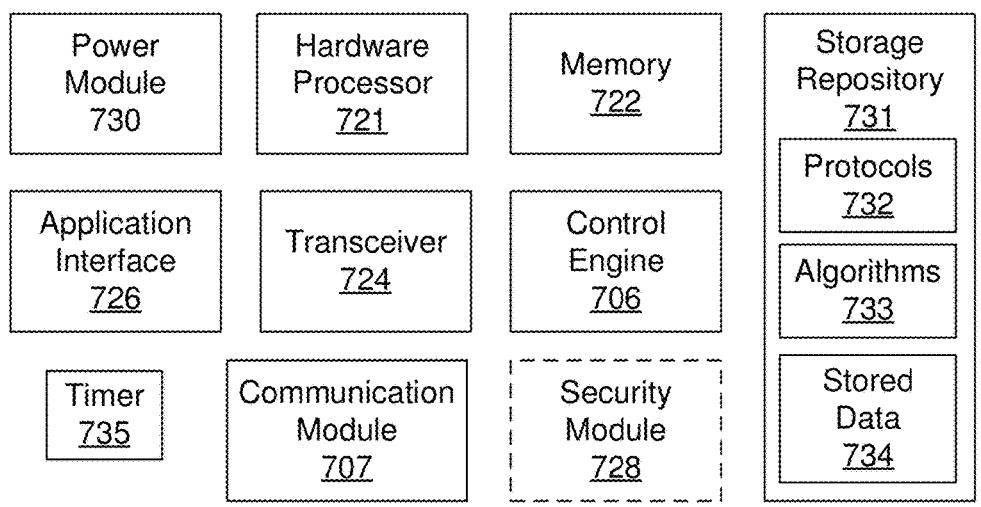
FIG. 7 shows a system diagram of a controller of the system of FIG. 6 according to certain example embodiments.

FIG. 7 shows a system diagram of a controller 604 according to certain example embodiments. Referring to the description above with respect to FIGS. 1A through 6, the controller 604 of FIG. 7 may be an example of a controller 604 discussed above with respect to FIGS. 6A and 6B. The controller 604 of FIG. 7 includes multiple components. In this case, the controller 604 of FIG. 7 includes a control engine 706, a communication module 707, a timer 735, a power module 730, a storage repository 731, a hardware processor 721, a memory 722, a transceiver 724, an application interface 726, and, optionally, a security module 728. The controller 604 (or components thereof) may be located at or near the various components of the system 698. In addition, or in the alternative, the controller 604 (or components thereof) may be located remotely from (e.g., in the cloud, at an office building) the various components of the system 698.

The storage repository 731 may be a persistent storage device (or set of devices) that stores software and data used to assist the controller 604 in communicating with one or more other components of a system, such as the users 651 (including associated user systems 655), the network manager 638, the sensor devices 660, and/or one or more other components of the system 698 of FIGS. 6A and 6B above. In one or more example embodiments, the storage repository 731 stores one or more protocols 732, one or more algorithms 733, and stored data 734.

The protocols 732 of the storage repository 731 may be one or more procedures (e.g., a series of method steps) and/or other similar operational processes that the control engine 706 of the controller 604 follows based on certain conditions at a point in time. The protocols 732 may include one or more communication protocols that are used to send and/or obtain data between the controller 604 and other components of a system (e.g., the system 698). Such protocols 732 used for communication may be a time-synchronized protocol. Examples of such time-synchronized protocols may include, but are not limited to, a highway addressable remote transducer (HART) protocol, a wirelessHART protocol, and an International Society of Automation (ISA) 100 protocol. In this way, one or more of the protocols 732 may provide a layer of security to the data transferred within a system (e.g., the system 698). Other protocols 732 used for communication may be associated with the use of, for example, Wi-Fi, Zigbee, visible light communication (VLC), cellular networking, BLE, UWB, and Bluetooth.

The algorithms 733 may be one or more formulas, mathematical models, forecasts, simulations, and/or other similar tools that the control engine 706 of the controller 604 uses to reach a computational conclusion. For example, one or more algorithms 733 may be used, in conjunction with one or more protocols 732, to assist a controller 604 to determine when to activate a notification mechanism (e.g., notification mechanism 535) of a floatation object 650. As another example, one or more algorithms 733 may be used, in conjunction with one or more protocols 732, to assist a controller 604 to determine when to notify a user 651 (e.g., via a user system 655) that an energy storage device (e.g., an energy storage device 561) of a floatation object 650 and/or an energy storage device (e.g., an energy storage device 361) of a platform 670 needs to be replaced. As yet another example, one or more algorithms 733 may be used, in conjunction with one or more protocols 732, to assist a controller 604 to determine when a floatation object 650 has been accidentally knocked out of the platform by an event not involving a flood. As still another example, one or more algorithms 733 may be used, in conjunction with one or more protocols 732, to assist the controller 604 in tracking the location of a floatation object 650 during a flood event.

Stored data 734 may be data associated with a waterway (e.g., waterway 199, waterway 699), ambient conditions in the environment in and proximate to the waterway, the example flood warning apparatuses (e.g., flood warning apparatuses 200, flood warning apparatuses 600), including their various components (e.g., floatation object, platform, extendable body, foundation) and subcomponents (e.g., sensor devices, controllers, energy storage devices), the users 651 (including associated user systems 655), an identification number of a floatation object 650, threshold values, tables, results of previously run or calculated algorithms 733, updates to protocols 732, user preferences, and/or another suitable data. Such data may be one or more types of data, including but not limited to historical data, present data, and future data (e.g., forecasts).

The stored data 734 may be associated with some measurement of time derived, for example, from the timer 735.

Examples of a storage repository 731 may include, but are not limited to, a database (or a number of databases), a file system, cloud-based storage, a hard drive, flash memory, some other form of solid-state data storage, or a suitable combination thereof. The storage repository 731 may be located on multiple physical machines, each storing all or a portion of the communication protocols 732, the algorithms 733, and/or the stored data 734 according to some example embodiments. Each storage unit or device may be physically located in the same or in a different geographic location.

The storage repository 731 may be operatively connected to the control engine 706. In one or more example embodiments, the control engine 706 includes functionality to communicate with the users 651 (including associated user systems 655), the sensor devices 660, the network manager 638, and the other components of the system 698. More specifically, the control engine 706 sends information to and/or obtains information from the storage repository 731 in order to communicate with the users 651 (including associated user systems 655), the sensor devices 660, the network manager 638, and the other components of the system 698. As discussed below, the storage repository 731 may also be operatively connected to the communication module 707 in certain example embodiments.

In certain example embodiments, the control engine 706 of the controller 604 controls the operation of one or more components (e.g., the communication module 707, the timer 735, the transceiver 724) of the controller 604. For example, the control engine 706 may activate the communication module 707 when the communication module 707 is in "sleep" mode and when the communication module 707 is needed to send data obtained from another component (e.g., a sensor device 660) in the system 698. In addition, the control engine 706 of the controller 604 may control the operation of one or more other components (e.g., an energy storage device, a notification mechanism), or portions thereof, of the system 698.

The control engine 706 of the controller 604 may communicate with one or more other components of the system 698. For example, the control engine 706 may use one or more protocols 732 to facilitate communication with the sensor devices 660 to obtain data (e.g., measurements of various parameters, such as temperature, position, flow rate), whether in real time or on a periodic basis and/or to instruct a sensor device 660 to take a measurement.

The control engine 706 may generate and process data associated with control, communication, and/or other signals sent to and obtained from the users 651 (including associated user systems 655), the sensor devices 660, the network manager 638, and the other components of the system 698. In certain embodiments, the control engine 706 of a controller 604 may communicate with one or more components of a system external to the system 698. For example, the control engine 706 may interact with an inventory management system by ordering replacements for components or pieces of equipment (e.g., a sensor device 660, an energy storage device) within the system 698 that has failed or is failing. As another example, the control engine 706 may interact with a contractor or workforce scheduling system by arranging for the labor needed to replace a component or piece of equipment in the system 698. In this way and in other ways, a controller 604 is capable of performing a number of functions beyond what could reasonably be considered a routine task.

In certain example embodiments, the control engine 706 may include an interface that enables the control engine 706 to communicate with the sensor devices 660, the user systems 655, the network manager 638, and the other components of the system 698. For example, if a user system 655 operates under IEC Standard 62386, then the user system 655 may have a serial communication interface that will transfer data to the controller 604. Such an interface may operate in conjunction with, or independently of, the protocols 732 used to communicate between the controller 604 and the users 651 (including corresponding user systems 655), the sensor devices 660, the network manager 638, and the other components of the system 698.

The control engine 706 (or other components of the controller 604) may also include one or more hardware components and/or software elements to perform its functions. Such components may include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 707 of the controller 604 determines and implements the communication protocol (e.g., from the protocols 732 of the storage repository 731) that is used when the control engine 706 communicates with (e.g., sends signals to, obtains signals from) the user systems 655, the sensor devices 660, the network manager 638, and the other components of the system 698. In some cases, the communication module 707 accesses the stored data 734 to determine which communication protocol is used to communicate with another component of the system 698. In addition, the communication module 707 may identify and/or interpret the communication protocol of a communication obtained by the controller 604 so that the control engine 706 may interpret the communication. The communication module 707 may also provide one or more of a number of other services with respect to data sent from and obtained by the controller 604. Such services may include, but are not limited to, data packet routing information and procedures to follow in the event of data interruption.

The timer 735 of the controller 604 may track clock time, intervals of time, an amount of time, and/or another measure of time. The timer 735 may also count the number of occurrences of an event, whether with or without respect to time. Alternatively, the control engine 706 may perform a counting function. The timer 735 is able to track multiple time measurements and/or count multiple occurrences concurrently. The timer 735 may track time periods based on an instruction obtained from the control engine 706, based on an instruction obtained from a user 651, based on an instruction programmed in the software for the controller 604, based on some other condition (e.g., the occurrence of an event) or from some other component, or from a combination thereof. In certain example embodiments, the timer 735 may provide a time stamp for each packet of data obtained from another component (e.g., a sensor device 660) of the system 698.

The power module 730 of the controller 604 obtains power from a power supply (e.g., AC mains) and manipulates (e.g., transforms, rectifies, inverts) that power to provide the manipulated power to one or more other components (e.g., the timer 735, the control engine 706) of the controller 604, where the manipulated power is of a type (e.g., alternating current, direct current) and level (e.g., 12V, 24V, 120V) that may be used by the other components of the controller 604. In some cases, the power module 730 may also provide power to one or more of the sensor devices 660.

The power module 730 may include one or more of a number of single or multiple discrete components (e.g., transistor, diode, resistor, transformer) and/or a microprocessor. The power module 730 may include a printed circuit board, upon which the microprocessor and/or one or more discrete components are positioned. In addition, or in the alternative, the power module 730 may be a source of power in itself to provide signals to the other components of the controller 604. For example, the power module 730 may be or include an energy storage device (e.g., similar to the energy storage devices discussed above). As another example, the power module 730 may be or include a localized photovoltaic power system.

The hardware processor 721 of the controller 604 executes software, algorithms (e.g., algorithms 733), and firmware in accordance with one or more example embodiments.

Specifically, the hardware processor 721 may execute software on the control engine 706 or another portion of the controller 604, as well as software used by the users 651 (including associated user systems 655), the network manager 638, and/or other components of the system 698. The hardware processor 721 may be an integrated circuit, a central processing unit, a multi-core processing chip, SoC, a multi-chip module including multiple multi-core processing chips, or other hardware processor in one or more example embodiments. The hardware processor 721 may be known by other names, including but not limited to a computer processor, a microprocessor, and a multi-core processor.

In one or more example embodiments, the hardware processor 721 executes software instructions stored in memory 722. The memory 722 includes one or more cache memories, main memory, and/or another suitable type of memory. The memory 722 may include volatile and/or non-volatile memory. The memory 722 may be discretely located within the controller 604 relative to the hardware processor 721. In certain configurations, the memory 722 may be integrated with the hardware processor 721.

In certain example embodiments, the controller 604 does not include a hardware processor 721. In such a case, the controller 604 may include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 604 (or portions thereof) to be programmable and function according to certain logic rules and thresholds without the use of a hardware processor. Alternatively, FPGAs, IGBTs, ICs, and/or similar devices may be used in conjunction with one or more hardware processors 721.

The transceiver 724 of the controller 604 may send and/or obtain control and/or communication signals. Specifically, the transceiver 724 may be used to transfer data between the controller 604 and the users 651 (including associated user systems 655), the sensor devices 660, the network manager 638, and the other components of the system 698. The transceiver 724 may use wired and/or wireless technology. The transceiver 724 may be configured in such a way that the control and/or communication signals sent and/or obtained by the transceiver 724 may be obtained and/or sent by another transceiver that is part of a user system 655, a sensor device 660, the network manager 638, and/or another component of the system 698. The transceiver 724 may send and/or obtain one or more signal types, including but not limited to radio frequency signals.

When the transceiver 724 uses wireless technology, a type of wireless technology may be used by the transceiver 724 in sending and obtaining signals. Such wireless technology may include, but is not limited to, Wi-Fi, Zigbee, VLC, cellular networking, BLE, UWB, and Bluetooth. The transceiver 724 may use one or more communication protocols (e.g., ISA100, HART) when sending and/or obtaining signals.

Optionally, in one or more example embodiments, the security module 728 secures interactions between the controller 604, the users 651 (including associated user systems 655), the sensor devices 660, the network manager 638, and the other components of the system 698. More specifically, the security module 728 authenticates communication from software based on security keys verifying the identity of the source of the communication. For example, user software may be associated with a security key enabling the software of a user system 655 to interact with the controller 604. Further, the security module 728 may restrict receipt of information, requests for information, and/or access to information.

A user 651 (including an associated user system 655), the sensor devices 660, the network manager 638, and the other components of the system 698 may interact with the controller 604 using the application interface 726. Specifically, the application interface 726 of the controller 604 obtains data (e.g., information, communications, instructions, updates to firmware) from and sends data (e.g., information, communications, instructions) to the user systems 655 of the users 651, the sensor devices 660, the network manager 638, and/or the other components of the system 698. Examples of an application interface 726 may be or include, but are not limited to, an application programming interface, a web service, a data protocol adapter, some other hardware and/or software, or a suitable combination thereof. Similarly, the user systems 655 of the users 651, the sensor devices 660, the network manager 638, and/or the other components of the system 698 may include an interface (similar to the application interface 726 of the controller 604) to obtain data from and send data to the controller 604 in certain example embodiments.

In addition, as discussed above with respect to a user system 655 of a user 651, one or more of the sensor devices 660, the network manager 638, and/or one or more of the other components of the system 698 may include a user interface. Examples of such a user interface may include, but are not limited to, a graphical user interface, a touchscreen, a keyboard, a monitor, a mouse, some other hardware, or a suitable combination thereof.

The controller 604, the users 651 (including associated user systems 655), the sensor devices 660, the network manager 638, and the other components of the system 698 may use their own system or share a system in certain example embodiments. Such a system may be, or contain a form of, an Internet-based or an intranet-based computer system that is capable of communicating with various software. A computer system includes a type of computing device and/or communication device, including but not limited to the controller 604. Examples of such a system may include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system may correspond to a computer system as described below with regard to FIG. 8.

Further, as discussed above, such a system may have corresponding software (e.g., user system software, sensor device software, controller software). The software may execute on the same or a separate device (e.g., a server, mainframe, desktop personal computer (PC), laptop, PDA, television, cable box, satellite box, kiosk, telephone, mobile phone, or other computing devices) and may be coupled by the communication network (e.g., Internet, Intranet, Extranet, LAN, WAN, or other network communication methods) and/or communication channels, with wire and/or wireless segments according to some example embodiments. The software of one system may be a part of, or operate separately but in conjunction with, the software of another system within the system 698.

Figure 8:
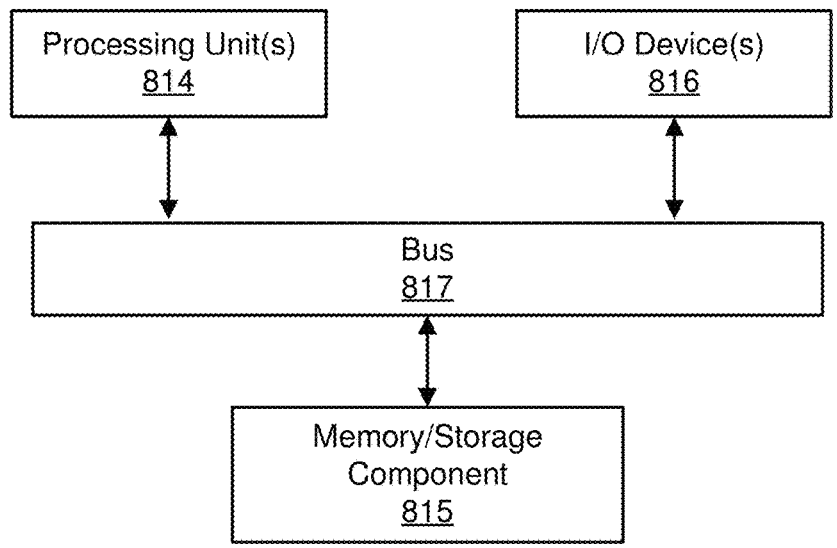
FIG. 8 shows a computing device in accordance with certain example embodiments.

FIG. 8 illustrates one embodiment of a computing device 818 that implements one or more of the various techniques described herein, and which is representative, in whole or in part, of the elements described herein pursuant to certain example embodiments. For example, a controller 604 (including components thereof, such as a control engine 706, a hardware processor 721, a storage repository 731, a power module 730, and a transceiver 724) may be considered a computing device 818. Computing device 818 is one example of a computing device and is not intended to suggest a limitation as to scope of use or functionality of the computing device and/or its possible architectures. Neither should the computing device 818 be interpreted as having a dependency or requirement relating to one or a combination of components illustrated in the example computing device 818.

The computing device 818 includes one or more processors or processing units 814, one or more memory/storage components 815, one or more input/output (I/O) devices 816, and a bus 817 that allows the various components and devices to communicate with one another. The bus 817 represents one or more types of bus structures, including a memory bus or memory controller, a peripheral bus, an accelerated graphics port, and a processor or local bus using a variety of bus architectures. The bus 817 includes wired and/or wireless buses.

The memory/storage component 815 represents one or more computer storage media. The memory/storage component 815 includes volatile media (such as random access memory (RAM)) and/or nonvolatile media (such as read only memory (ROM), flash memory, optical disks, magnetic disks, and so forth). The memory/storage component 815 includes fixed media (e.g., RAM, ROM, a fixed hard drive, etc.) as well as removable media (e.g., a Flash memory drive, a removable hard drive, an optical disk, and so forth).

One or more I/O devices 816 allow a user 651 to enter commands and information to the computing device 818, and also allow information to be presented to the user 651 and/or other components or devices. Examples of input devices 816 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is an available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in another method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or another other medium which is used to store the desired information and which is accessible by a computer.

The computer device 818 is connected to a network (not shown) (e.g., a LAN, a WAN such as the Internet, cloud, or another other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or another other computing system capable of executing computer readable instructions), and the aforementioned input and output means take other forms, now known or later developed, in other example embodiments. Generally speaking, the computer device 818 (also sometimes called a computer system) includes at least the minimal processing, input, and/or output means necessary to practice one or more embodiments.

Further, those skilled in the art will appreciate that one or more elements of the aforementioned computer device 818 is located at a remote location and connected to the other elements over a network in certain example embodiments. Further, one or more embodiments is implemented on a distributed system having one or more nodes, where each portion of the implementation (e.g., a notification mechanism, a sensor device 660, an energy storage device) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 9:
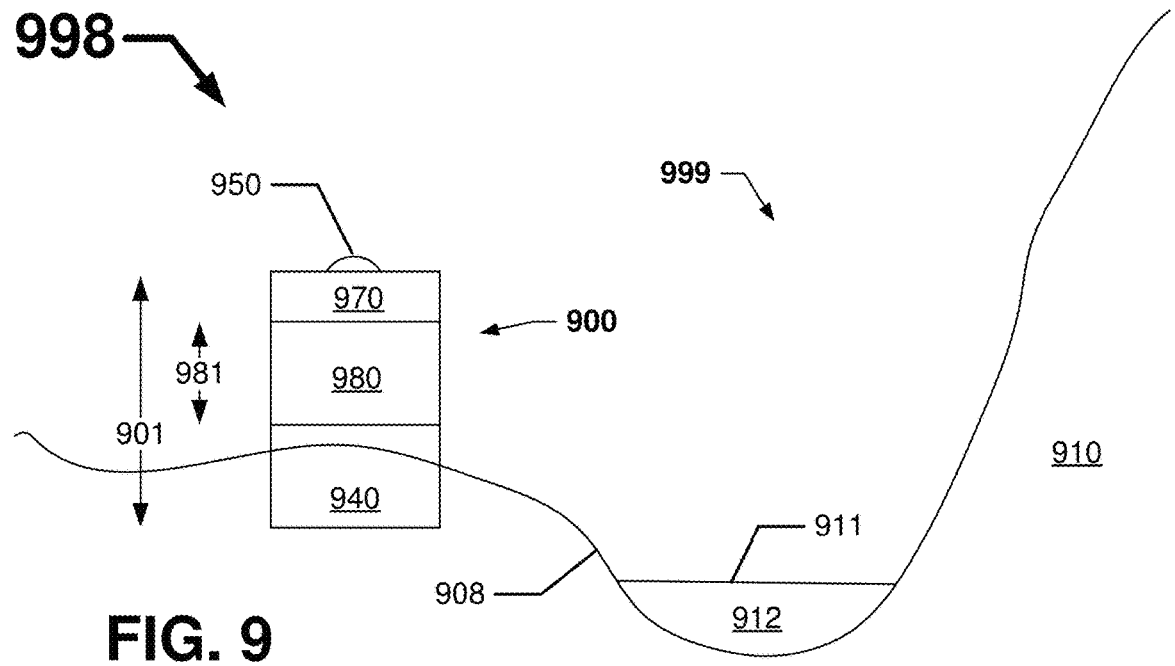
FIGS. 9 through 14 show a landscape in which an example flood warning apparatus is monitoring a waterway over time according to certain example embodiments.
Figure 10:
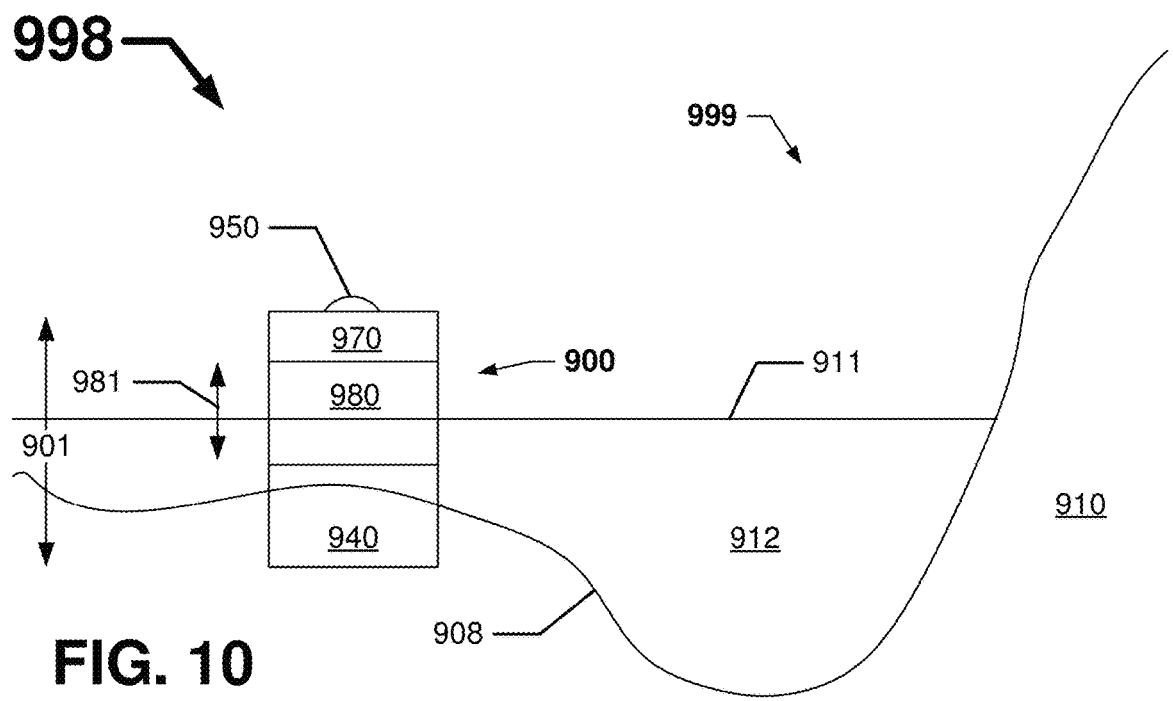
Figure 11:
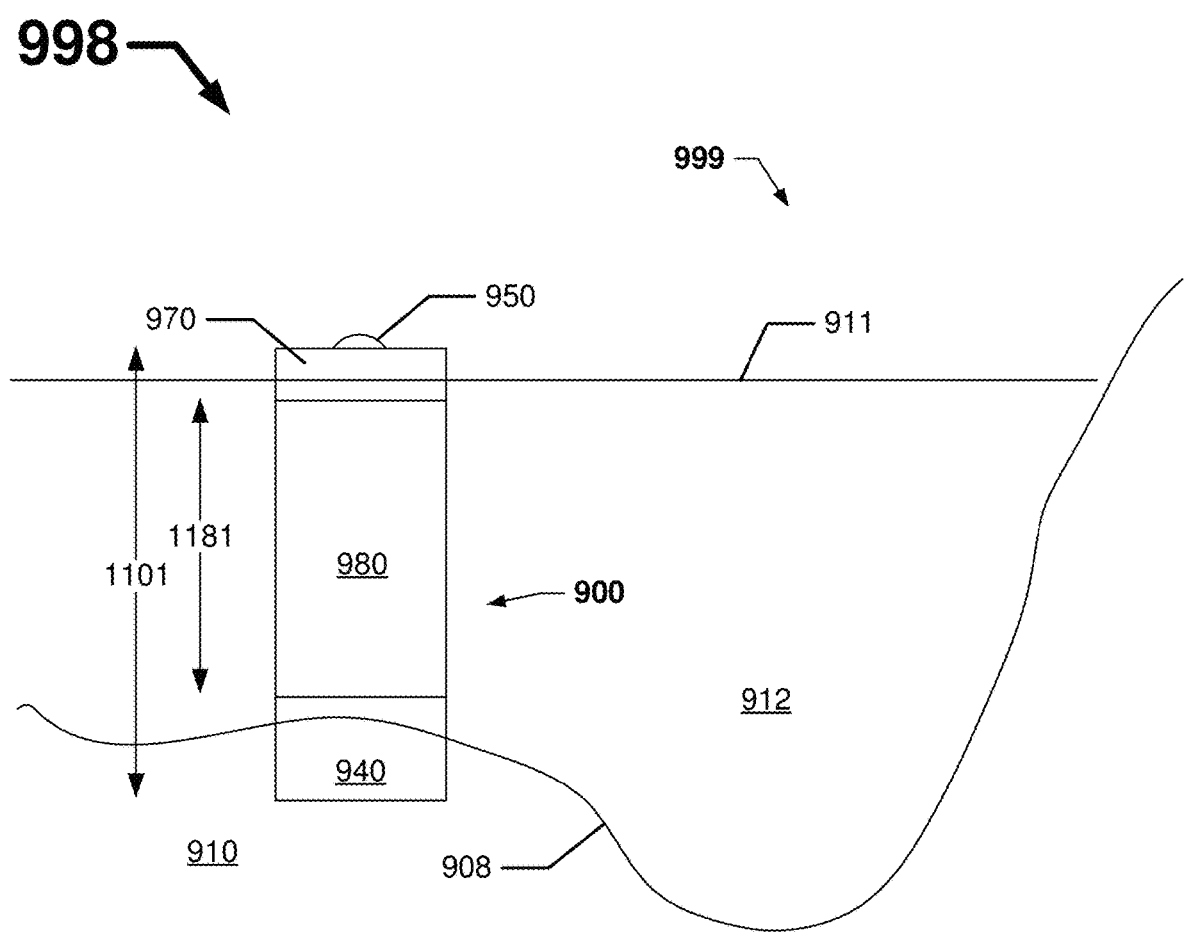
Figure 12A:
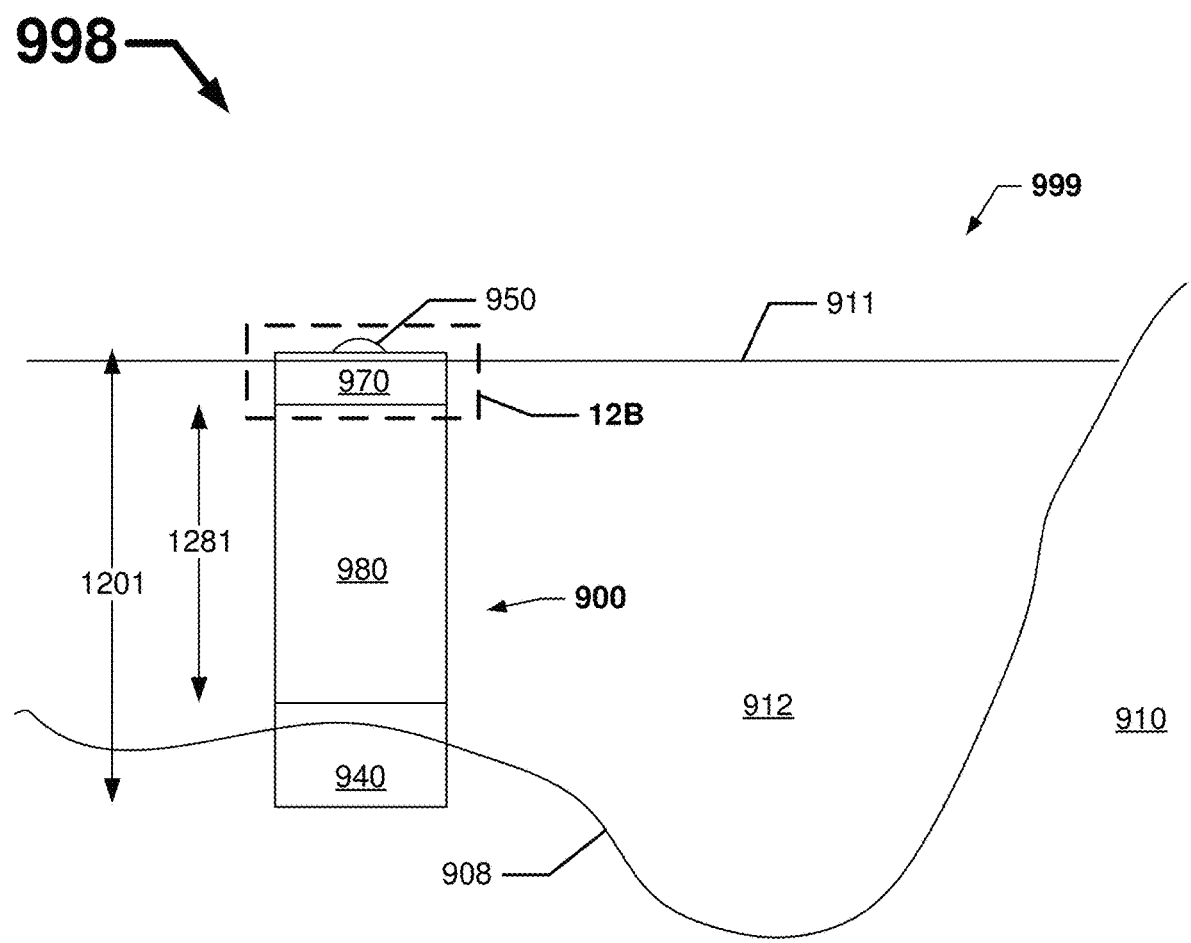
Figure 12B:
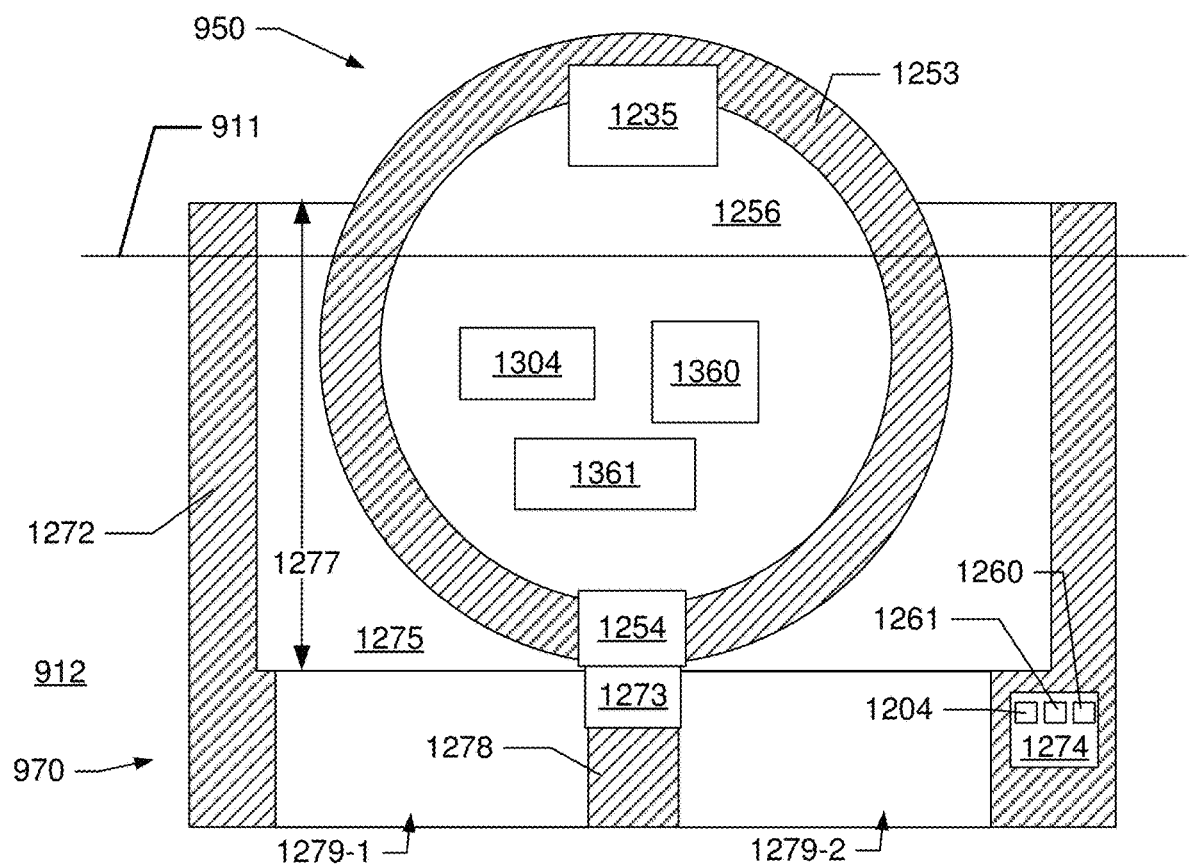
Figure 13A:
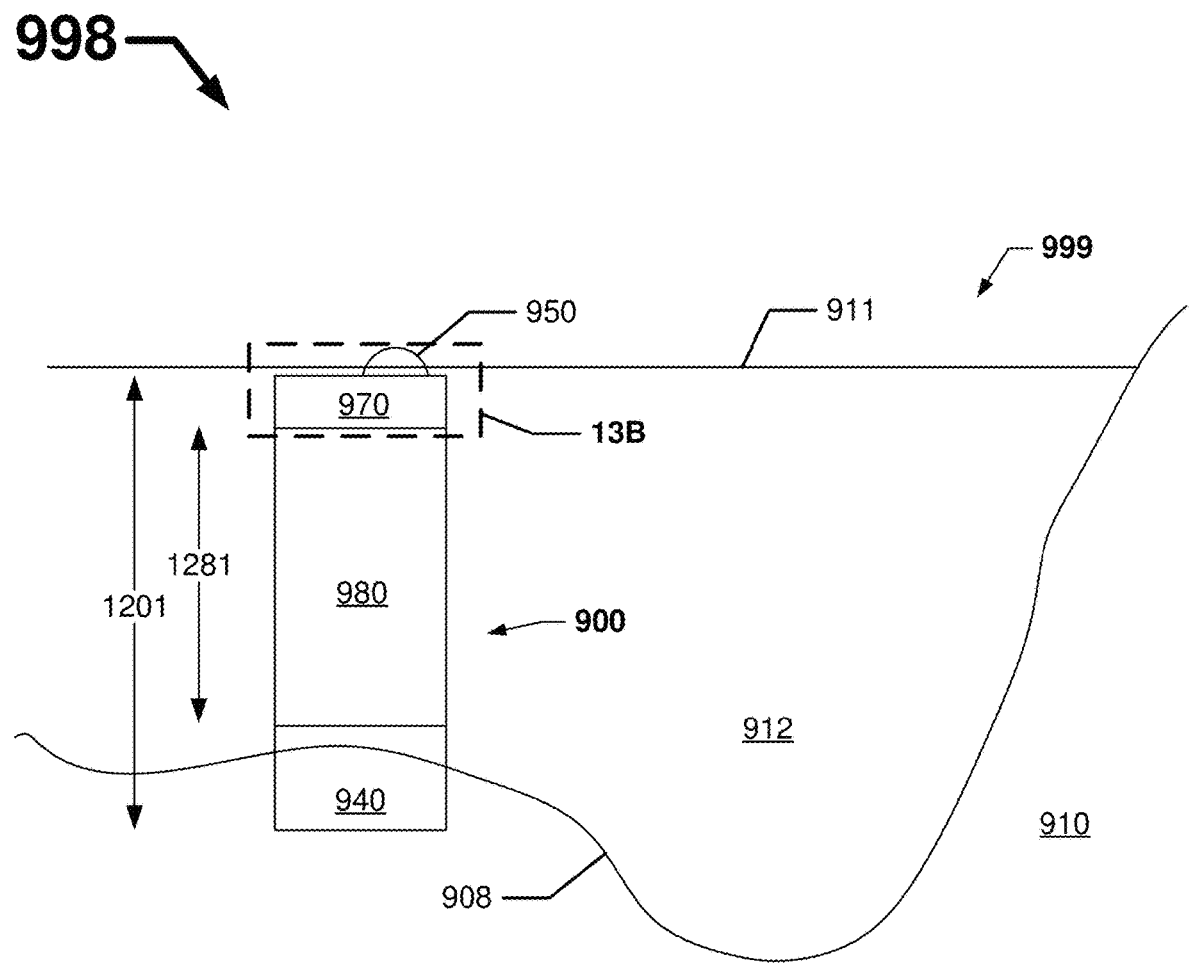
Figure 13B:
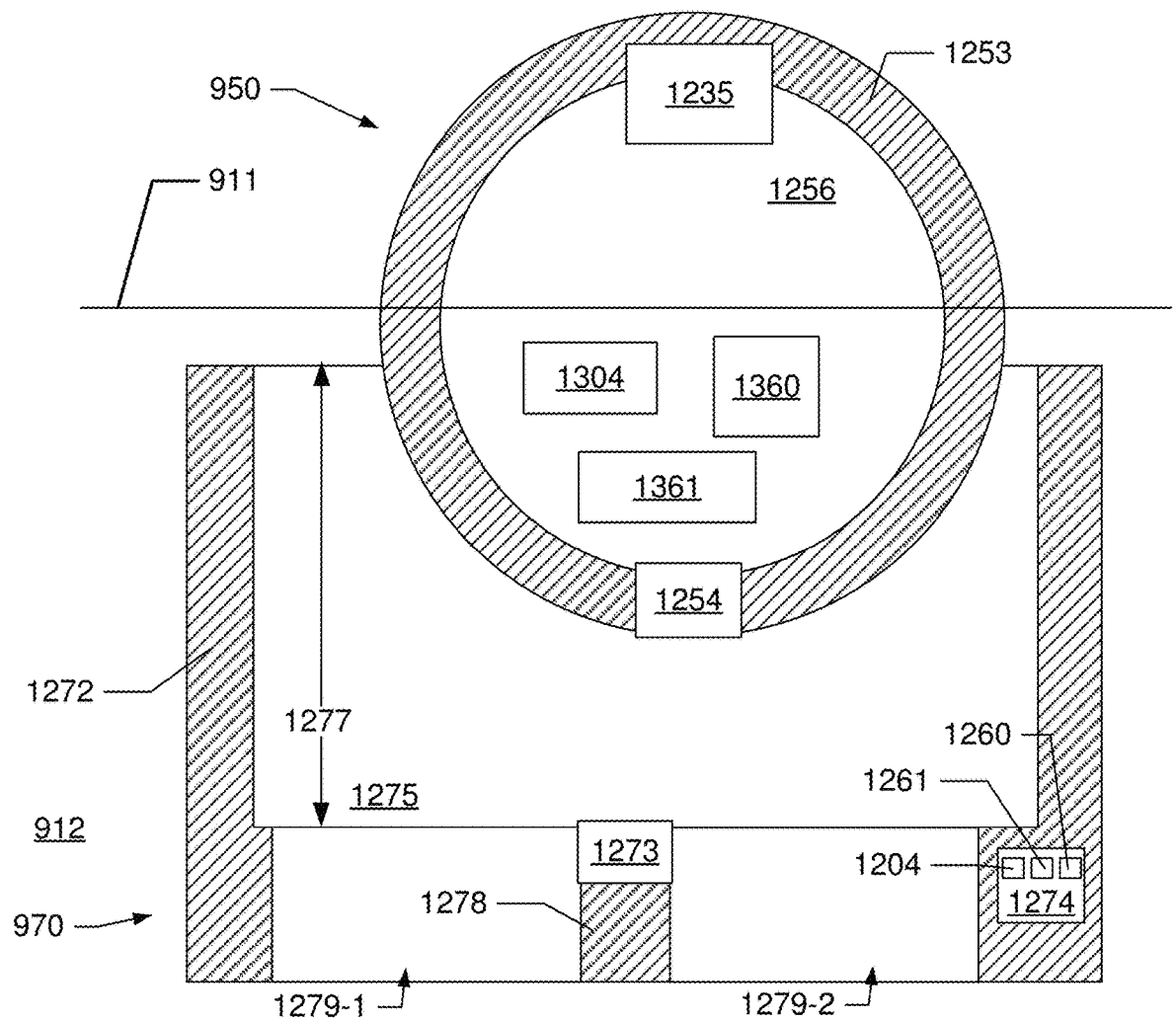
Figure 14:
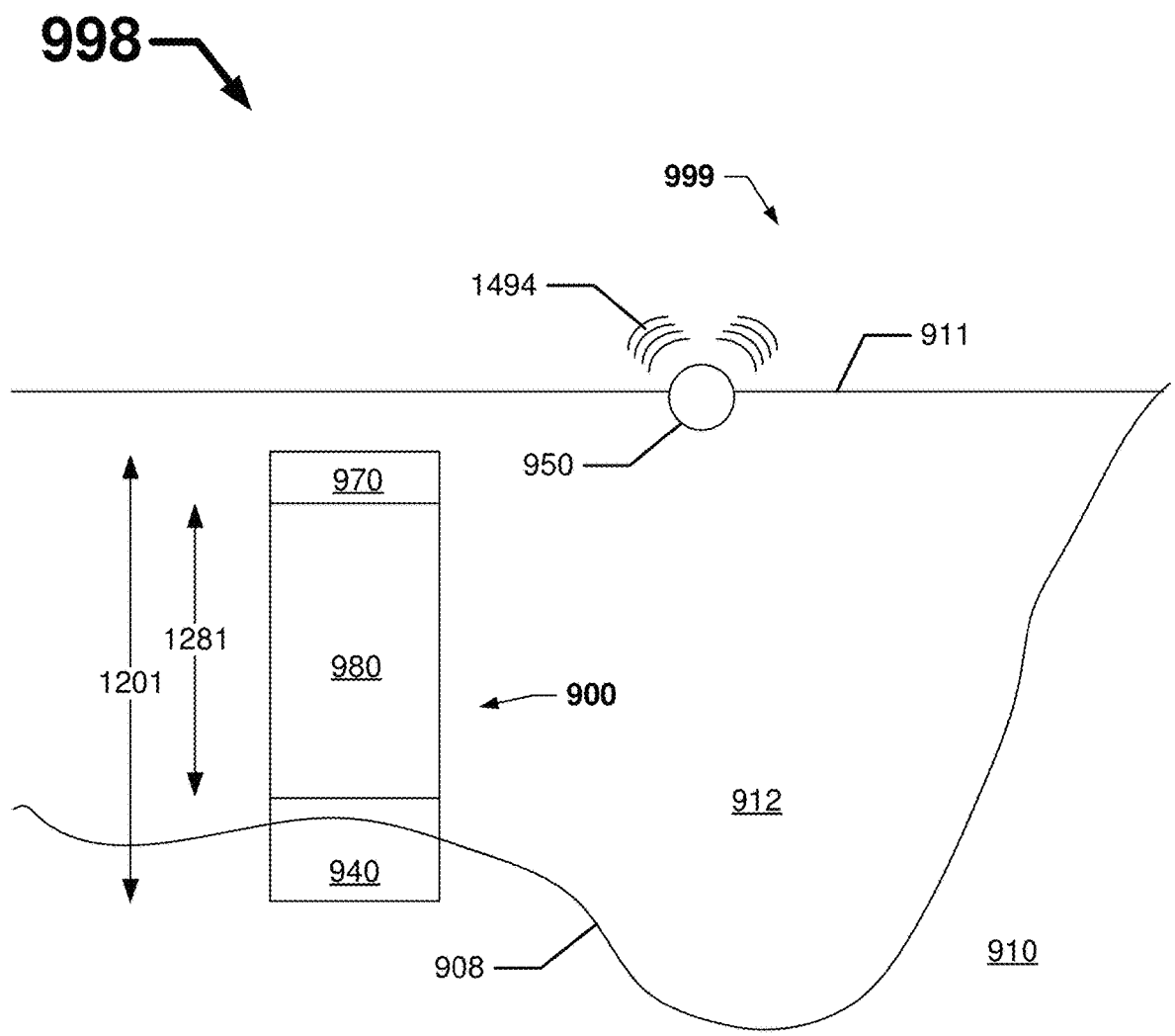

FIGS. 9 through 14 show a landscape 998 in which an example flood warning apparatus 900 is monitoring a waterway over time according to certain example embodiments. Specifically, FIG. 9 shows the landscape 998 at a point in time where there are low/normal conditions with respect to the level of the waterline 911. FIG. 10 shows the landscape 998 as the level of the waterline 911 rises. FIG. 11 shows the landscape 998 when the level of the waterline 911 is elevated. FIGS. 12A and 12B show the landscape 998 and a detailed cross-sectional side view of the platform 970 and the floatation object 950, respectively, when the level of the waterline 911 further increases. FIGS. 13A and 13B show the landscape 998 and a detailed cross-sectional side view of the platform 970, respectively, when the level of the waterline 911 triggers a release of the floatation object 950. FIG. 14 shows the landscape 998 with the floatation object 950 activated and floating in the water 912.

Referring to the description above with respect to FIGS. 1A through 8, the landscape 998 of FIGS. 9 through 14 includes a waterway 999 and the example flood warning apparatus 900. The waterway 999 is substantially the same as the waterways discussed above. For example, the waterway 999 of FIGS. 9 through 14 has a ground 908 at the top of the Earth 910. In this case, at the point in time captured in FIG. 9, the ground 908 is partly in the form of a riverbed where the ground 908 is under water 912. The rest of the ground 908 is out of the water 912. There is a waterline 911 that defines the top of the water 912 above the ground 908.

The flood warning apparatus 900 includes a foundation 940, an extendable body 980, a platform 970, and a floatation object 950. These components (including their subcomponents) of the flood warning apparatus 900 of FIGS. 9 through 14 are substantially the same as the corresponding components (including their subcomponents) of the flood warning apparatuses discussed above.

In FIG. 9, during normal (non-flooding) conditions, the foundation 940 of the flood warning apparatus 900 is partly buried in the Earth 910 and partly above ground 908 adjacent to the water 912. The extendable body 980 of the flood warning apparatus 900 is disposed atop the foundation 940 and extends upward at a distance that equates to its minimum height 981 (which also puts the flood warning apparatus 900 at its minimum height 901). The platform 970 of the flood warning apparatus 900 is disposed atop the extendable body 980. The floatation object 950 is secured by the platform 970, as described in more detail below with respect to FIG. 12B.

In FIG. 10, which captures the landscape 998 at a time subsequent to the time captured in FIG. 9, the level of the waterline 911 has increased so that the water 912 covers the foundation 940 and the lower half of the extendable body 980. Since the waterline 911 is still below the platform 970, the extendable body 980 remains as its minimum height 981 (and so also the flood warning apparatus 900 remains at its minimum height 901). Also, the floatation object 950 continues to be retained within the platform 970.

In FIG. 11, which captures the landscape 998 at a time subsequent to the time captured in FIG. 10, the level of the waterline 911 has again increased so that now water 912 covers the foundation 940, all of the extendable body 980, and the lower part of the platform 970. Since the platform 970 is buoyant, the buoyancy of the platform 970 rises with the increased level of the waterline 911. Consequently, the extendable body 980 is extended to a height 1181 that is greater than its minimum height 981 (but less than its maximum height). Similarly, the flood warning apparatus 900 is now at a height 1101 that is greater than its minimum height 901 but less than its maximum height. The floatation object 950 continues to be retained within the platform 970.

In FIG. 12A, which captures the landscape 998 at a time subsequent to the time captured in FIG. 11, the level of the waterline 911 has again increased so that now the water 912 covers the foundation 940, all of the extendable body 980, and almost all of the platform 970. At the point in time captured in FIG. 12A, the extendable body 980 is extended to its maximum height 1281. Similarly, the flood warning apparatus 900 is also at its maximum height 1201. As a result, even though the platform 970 is buoyant, the fully extended extendable body 980 overcomes the buoyant force of the platform 970 and prevents the platform 970 from rising further with the water 912.

FIG. 12B shows a cross-sectional side view of the platform 970 and the floatation object 950 at the time captured in FIG. 12A. The platform 970 of FIG. 12A is substantially similar to the platform 370 of FIG. 3, and the floatation object 950 of FIG. 12A is substantially similar to the floatation object 550 of FIG. 5. For example, the platform 970 has a side wall 1272 and a bottom wall 1278 that form a cavity 1275 that is open at the top. The cavity 1275 has a height 1277 that is sufficient to receive and retain the floatation object 950. In this case, the height 1277 of the cavity 1275 is approximately ¾ the height of the floatation object 950 in the cavity 1275. In this way, the side wall 1272 provides some protection (e.g., from wind) to the floatation object 950 positioned within the cavity 1275. When viewed from above, the side wall 1272 of the platform 970 forms a circle.

The platform 970 has at least two channels 1279 (channel 1279-1 and channel 1279-2) that traverse the thickness of the bottom wall 1278. Each channel 1279 is configured to allow for an equilibrium in the waterline 911 outside the cavity 1275 and the waterline 911 within the cavity 1275. The platform 970 is configured to float on the water 912. As such, as discussed above, with the platform 970 disposed atop the distal end of the extendable body 980, the platform 970 adjusts the height of the extendable body 980 when the waterline 911 reaches the height of the platform 970.

There is a chamber 1274 that is positioned in the side wall 1272. The chamber 1274 is isolated from the cavity 1275 and the environment outside the platform 970, thereby offering some degree of protection to a controller 1204, a sensor device 1260 (or portions thereof), and an energy storage device 1261 (or portions thereof) within the chamber 1274. The controller 1204, the sensor device 1260, and the energy storage device are substantially similar to the controllers, the sensor devices, and the energy storage devices discussed above. To simplify the drawing, the coupling features (e.g., similar to the coupling features 319 discussed above) are omitted but may physically be present.

The platform 970 includes a retention feature 1273 that is configured to retain the floatation object 950 until the platform 970 is mostly or entirely submerged in the water 912, which causes the retention feature 1273 to release and fully activate the floatation object 950. While the floatation object 950 is retained by a retention feature 1273, the notification mechanism 1235 of the floatation object 950 is deactivated. The retention feature 1273 may have or include an electrically created magnetic field (e.g., in the form of a reed switch) that uses magnetic forces to retain a retention feature 1254 of the floatation object 950 in the form of a magnet of the opposite polarity.

The floatation object 950 of FIG. 12B is a sphere that has one wall 1253 that forms a cavity 1256 that is enclosed. Within the cavity 1256 (at least in part) are a controller 1304, a sensor device 1360, an energy storage device 1361, a retention feature 1254, and a notification mechanism 1235, which are substantially similar to the controllers, the sensor devices, the energy storage devices, the retention features, and the notification mechanisms discussed above. The wall 1253 that forms the cavity 1256 protects the controller 1304, the sensor device 1360, the energy storage device 1361, and the notification mechanism 1235 from the water 912.

In FIG. 13A, which captures the landscape 998 at a time subsequent to the time captured in FIG. 12A, the level of the waterline 911 has again increased so that now the water 912 covers the foundation 940, all of the extendable body 980, and all of the platform 970. At the point in time captured in FIG. 13A, the extendable body 980 is extended to its maximum height 1281. Similarly, the flood warning apparatus 900 is also at its maximum height 1201. As a result, even though the platform 970 is buoyant, the fully extended extendable body 980 overcomes the buoyant force of the platform 970 and prevents the platform 970 from rising further with the water 912.

FIG. 13B shows a cross-sectional side view of the platform 970 and the floatation object 950 at the time captured in FIG. 13A. Specifically, FIG. 13B shows that the buoyancy of the floatation object 950 in the water 912 creates an upward buoyant force that overcomes the force (e.g., magnetic force) that the retention feature 1273 of the platform 970 applies to the retention feature 1254 of the floatation object 950. As a result, the floatation object 950 is released from the retention feature 1273 of the platform 970. However, the floatation object 950 remains within the cavity 1275 of the platform 970 because the level of the waterline 911 is not high enough to allow the floatation object 950 to clear the side wall 1272 and float away from the platform 970.

The side wall 1272, the bottom wall 1278, the cavity 1275, and the channels 1279 of the platform 970 are completely submerged in the water 912. The controller 1204, the sensor device 1260, and the energy storage device 1261 within the chamber 1274 continue to be isolated from the water 912. Also, the wall 1253 of the floatation object 950 that forms the cavity 1256 continues to protect the controller 1304, the sensor device 1360, the energy storage device 1361, and the notification mechanism 1235 from the water 912. (The optional heating element (e.g., heating element 362) is not present in this case.)

In FIG. 14, which captures the landscape 998 at a time subsequent to the time captured in FIG. 13A, the level of the waterline 911 has again increased so that the water 912 continues to submerge the foundation 940, all of the extendable body 980, and all of the platform 970. At the point in time captured in FIG. 14, the extendable body 980 continues to be extended to its maximum height 1281. Similarly, the flood warning apparatus 900 also continues to be at its maximum height 1201. As a result, even though the platform 970 is buoyant, the fully extended extendable body 980 continues to overcome the upward buoyant force of the platform 970 and prevents the platform 970 from rising further with the water 912.

Also, the level of the waterline 911 is high enough that the floatation object 950 clears the wall 1272 of the platform 970. As a result, the floatation object 950 is free to be carried along with the flow of the water 912 (in this case, toward the right of the flood warning apparatus 900). At some point (e.g., upon being released from the retention feature 1273 of the platform 970, after completely leaving the cavity 1275 of the platform 970, after traveling a minimum distance from the platform 970), the alert notification mechanism 1235 is activated, which causes the alert notification mechanism 1235 to broadcast a high water alert notification 1494.

Figure 15:
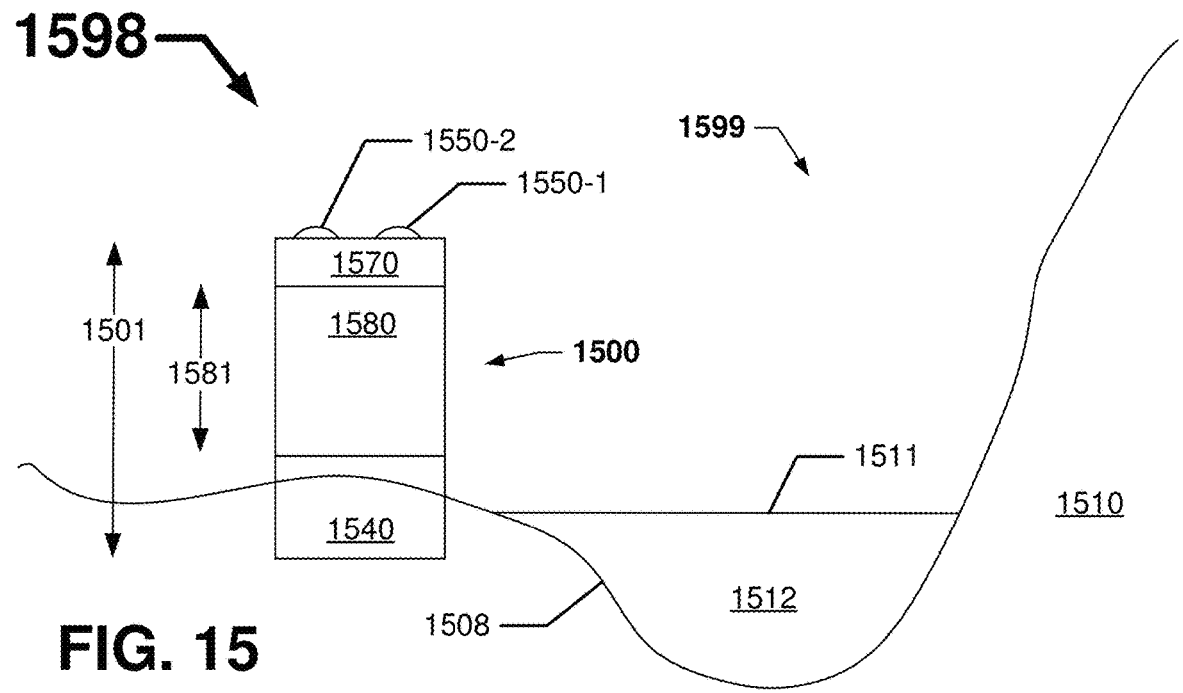
FIGS. 15 through 18 show another landscape in which another example flood warning apparatus is monitoring a waterway over time according to certain example embodiments.
Figure 16:
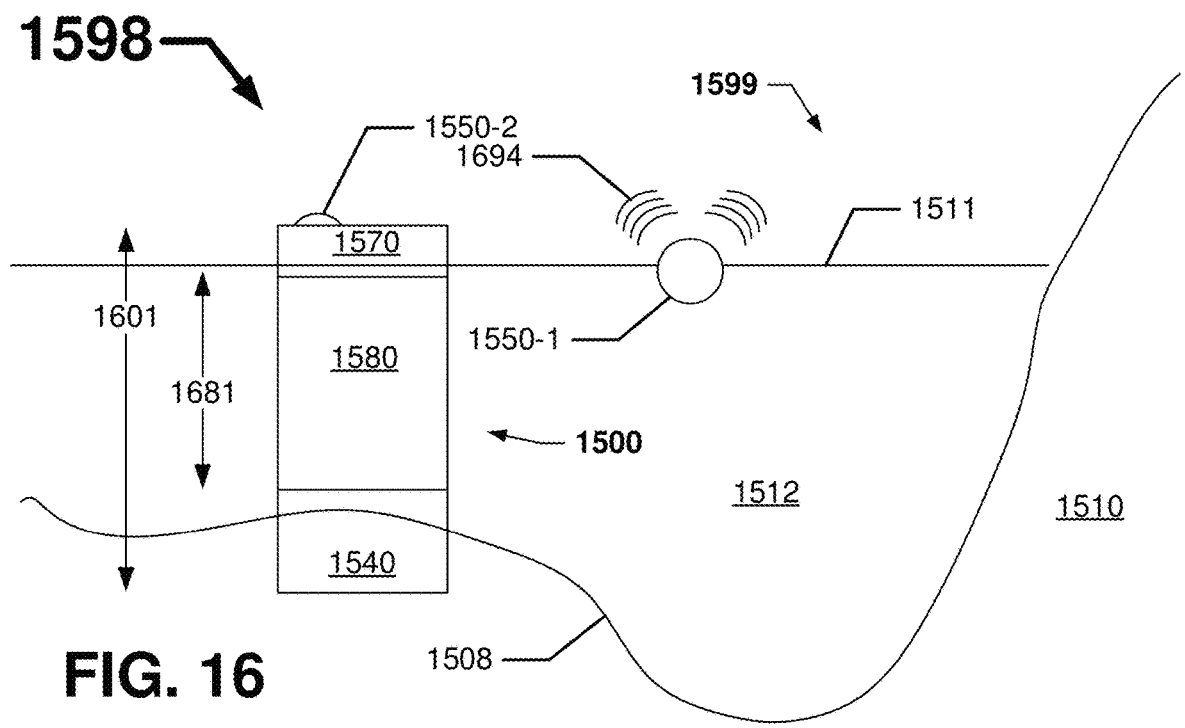
Figure 17:
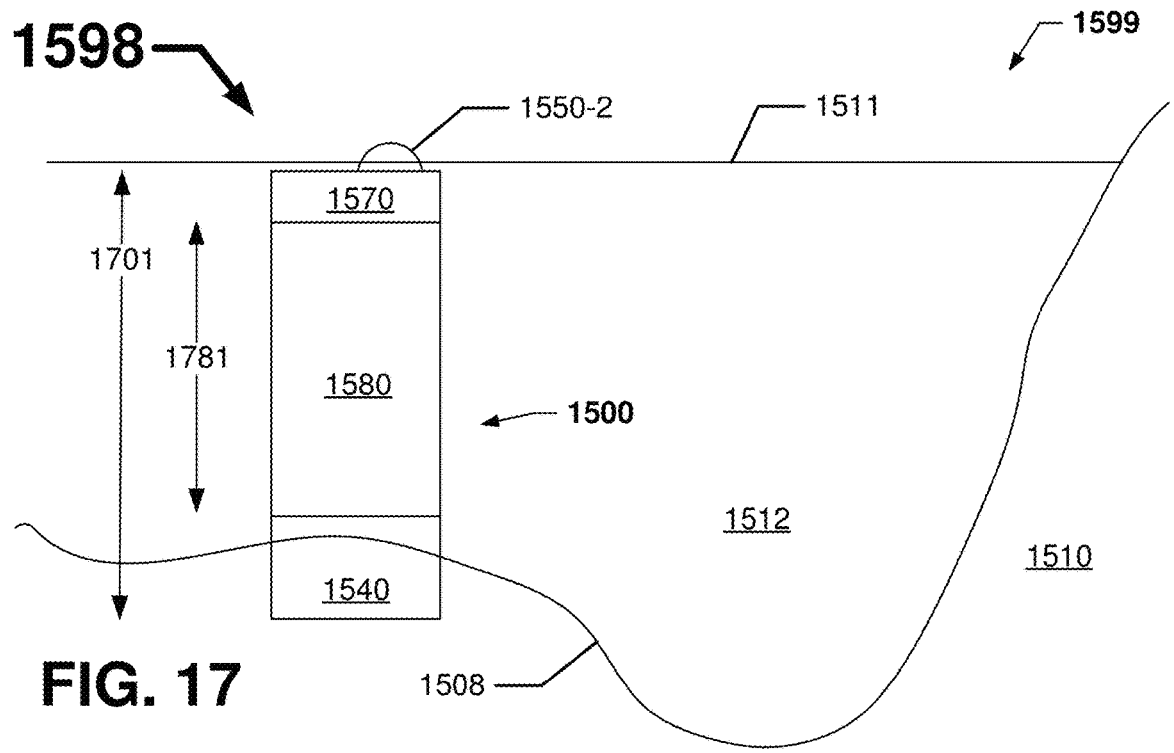
Figure 18:
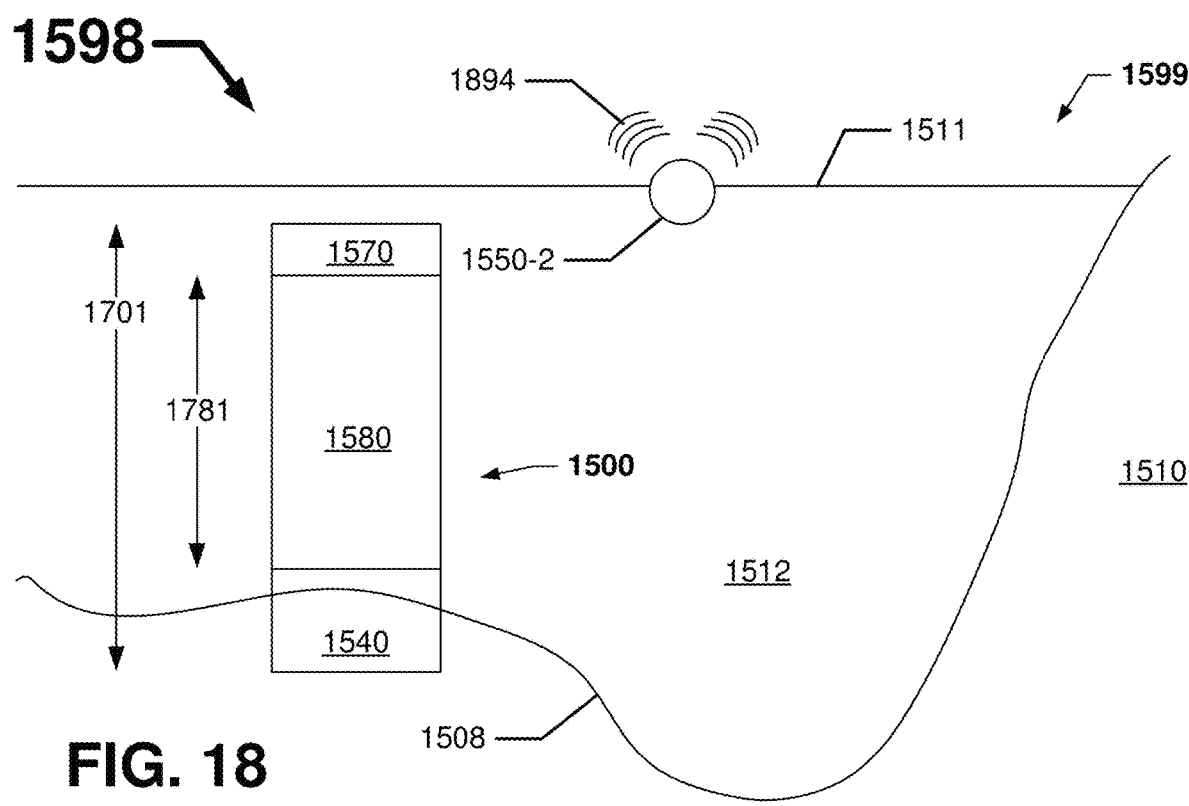

FIGS. 15 through 18 show another landscape 1598 in which another example flood warning apparatus 1500 is monitoring a waterway 1599 over time according to certain example embodiments. Specifically, FIG. 15 shows the landscape 1598 at a point in time where there are low/normal conditions with respect to the level of the waterline 1511. FIG. 16 shows the landscape 1598 as the level of the waterline 1511 rises, causing the floatation object 1550-1 to become activated and floating in the water 1512. FIG. 17 shows the landscape 1598 when the level of the waterline 1511 is elevated. FIG. 18 shows the landscape 1598 with the floatation object 1550-2 activated and floating in the water 1512.

Referring to the description above with respect to FIGS. 1A through 14, the landscape 1598 of FIGS. 15 through 18 includes a waterway 1599 and the example flood warning apparatus 1500. The waterway 1599 is substantially the same as the waterways discussed above. For example, the waterway 1599 of FIGS. 15 through 18 has a ground 1508 at the top of the Earth 1510. In this case, at the point in time captured in FIG. 15, the ground 1508 is partly in the form of a riverbed where the ground 1508 is under water 1512. The rest of the ground 1508 is out of the water 1512. There is a waterline 1511 that defines the top of the water 1512 above the ground 1508.

The flood warning apparatus 1500 includes a foundation 1540, an extendable body 1580, a platform 1570, and two floatation objects 1550 (floatation object 1550-1 and floatation object 1550-2). These components (including their subcomponents) of the flood warning apparatus 1500 of FIGS. 15 through 18 are substantially the same as the corresponding components (including their subcomponents) of the flood warning apparatuses discussed above.

In FIG. 15, during normal (non-flooding) conditions, the foundation 1540 of the flood warning apparatus 1500 is partly buried in the Earth 1510 and partly above ground 1508 adjacent to the water 1512. The extendable body 1580 of the flood warning apparatus 1500 is disposed atop the foundation 1540 and extends upward at a distance that equates to its minimum height 1581 (which also puts the flood warning apparatus 1500 at its minimum height 1501). The platform 1570 of the flood warning apparatus 1500 is disposed atop the extendable body 1580. The floatation objects 1550 are secured by the platform 1570.

In FIG. 16, which captures the landscape 1598 at a time subsequent to the time captured in FIG. 15, the level of the waterline 1511 has again increased so that now water 1512 covers the foundation 1540, all of the extendable body 1580, and the lower part of the platform 1570. Since the platform 1570 is buoyant, the buoyancy of the platform 1570 rises with the increased level of the waterline 1511. Consequently, the extendable body 1580 is extended to a height 1681 that is greater than its minimum height 1581 (but less than its maximum height). Similarly, the flood warning apparatus 1500 is now at a height 1601 that is greater than its minimum height 1501 but less than its maximum height.

Also, the time captured in FIG. 16 shows that floatation object 1550-1 has been released from the platform 1570 and activated to broadcast its high water alert notification 1694 as the floatation object 1550-1 floats in the water 1512 above the waterline 1511 away from the platform 1570. Meanwhile, the floatation object 1550-2 continues to be retained within the platform 1570. In this case, the retention feature (e.g., retention feature 373) of the platform 1570 that retains the floatation object 1550-1 operates using a mechanism other than a reed switch, which is what the retention feature of the platform 1570 that retains the floatation object 1550-2 uses. For example, the retention feature of the platform 1570 that retains the floatation object 1550-1 may operate using a spring-loaded piston that releases when a sensor device (e.g., sensor device 360) of the platform 1570 detects that the extendable body 1580 has reached a threshold height that is just below the height 1681 shown in FIG. 16. In such a case, when the threshold height is reached, the spring-loaded piston is released (extended) to eject the floatation object 1550-1 out of the platform 1570 and into the surrounding water 1512.

When the floatation object 1550-1 is released and activated, the notification mechanism of the floatation object 1550-1 may be configured to broadcast a medium or otherwise relatively reduced (e.g., in terms of volume, in terms of light output) alert notification 1694 when the condition (e.g., the position or height of the extendable body exceeds a threshold value) is met to be released from the platform 1570 by the retention feature of the platform 1570.

In FIG. 17, which captures the landscape 1598 at a time subsequent to the time captured in FIG. 16, the level of the waterline 1511 has again increased so that now the water 1512 covers the foundation 1540, all of the extendable body 1580, and all of the platform 1570. At the point in time captured in FIG. 17, the extendable body 1580 is extended to its maximum height 1781. Similarly, the flood warning apparatus 1500 is also at its maximum height 1701. As a result, even though the platform 1570 is buoyant, the fully extended extendable body 1580 overcomes the buoyant force of the platform 1570 and prevents the platform 1570 from rising further with the water 1512. Further, the buoyancy of the floatation object 1550-2 in the water 1512 creates an upward buoyant force that overcomes the force (e.g., magnetic force) that the retention feature (e.g., retention feature 373) of the platform 1570 applies to the retention feature (e.g., retention feature 554) of the floatation object 1550-2. As a result, the floatation object 1550-2 is released from the retention feature of the platform 1570. However, the floatation object 1550-2 remains within the cavity (e.g., cavity 375) of the platform 1570 because the level of the waterline 1511 is not high enough to allow the floatation object 1550-2 to float away from the platform 1570.

As the waterline 1511 continues to rise, as shown in FIG. 18, the floatation object 1550-2 is released and activated. When this occurs, the notification mechanism of the floatation object 1550-2 may be configured to broadcast a medium or otherwise relatively reduced (e.g., in terms of volume, in terms of light output) alert notification 1894 when the condition (e.g., the position or height of the extendable body exceeds a threshold value) is met to be released from the platform 1570 by the retention feature of the platform 1570.

Figure 19:
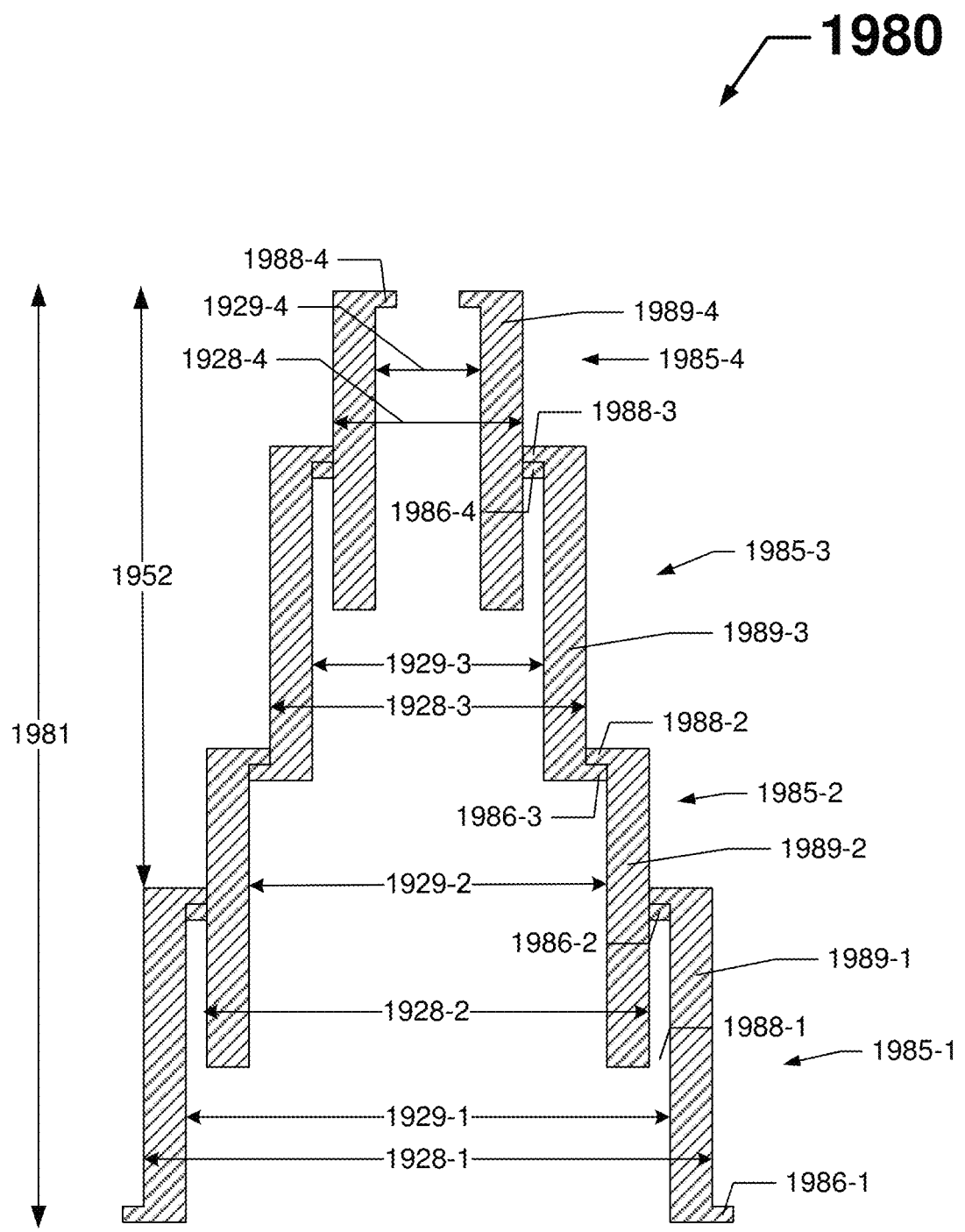
FIG. 19 shows a cross-sectional view of another extendable body according to certain example embodiments.

FIG. 19 shows a cross-sectional side view of another extendable body 1980 according to certain example embodiments. Referring to the description above with respect to FIGS. 1A through 18, the extendable body 1980 of FIG. 19 is substantially the same as the extendable body 480 discussed below with respect to FIGS. 4A and 4B, except as discussed below. For example, the extendable body 1980 of FIG. 19 has four segments 1985 (segment 1985-1, segment 1985-2, segment 1985-3, and segment 1985-4). In this case, each segment 1985 has substantially the same height as each other.

Each segment 1985 has a wall 1989 that defines the height of the segment 1985. The wall 1989 of each segment 1985 forms a cylinder. Also in this case, the wall 1989 of each segment 1985 has a different diameter (e.g., inner diameter, outer diameter). Specifically, the wall 1989-1 of segment 1985-1 has an outer diameter 1928-1 and an inner diameter 1929-1. The wall 1989-2 of segment 1985-2 has an outer diameter 1928-2 and an inner diameter 1929-2. The wall 1989-3 of segment 1985-3 has an outer diameter 1928-3 and an inner diameter 1929-3. The wall 1989-4 of segment 1985-4 has an outer diameter 1928-4 and an inner diameter 1929-4. The inner diameter 1929-1 of the wall 1989-1 of segment 1985-1 is greater than the outer diameter 1928-2 of the wall 1989-2 of segment 1985-2. The inner diameter 1929-2 of the wall 1989-2 of segment 1985-2 is greater than the outer diameter 1928-3 of the wall 1989-3 of segment 1985-3. The inner diameter 1929-3 of the wall 1989-3 of segment 1985-3 is greater than the outer diameter 1928-4 of the wall 1989-4 of segment 1985-4.

Each segment 1985 has an outward extension 1986 (e.g., flange) that extends laterally away from the wall 1989 and an inward extension 1988 (e.g., flange) that extends laterally away from the wall 1989. Specifically, the wall 1989-1 of segment 1985-1 has an outward extension 1986-1 at its proximal end and an inward extension 1988-1 at its distal end. The wall 1989-2 of segment 1985-2 has an outward extension 1986-2 at its proximal end and an inward extension 1988-2 at its distal end. The wall 1989-3 of segment 1985-3 has an outward extension 1986-3 at its proximal end and an inward extension 1988-3 at its distal end. The wall 1989-4 of segment 1985-4 has an outward extension 1986-4 at its proximal end and an inward extension 1988-4 at its distal end.

A default position of the outward extension 1986 of a segment 1985 may be at the bottom (proximal end) of the wall 1989. In addition, a default position of the inward extension 1988 of a segment 1985 may be at the top (distal end) of the wall 1989. In some cases, as shown in FIG. 19, some or all of the inward extensions 1988 and/or the outward extensions 1986 may be adjusted along the height of the wall 1989 relative to their default positions. This feature may be implemented by an installer in the field so that the maximum height 1981 of the extendable body 1980 may be set manually (rather than have a set maximum height). In addition, or the alternative, this feature may be implemented by an installer in the field so that the range 1952 of motion between the maximum height 1981 and the minimum height of the extendable body 1980 may be set manually (rather than have a set range). In this example, the outward extensions 1986 and the inward extensions 1988 are set in their default positions except where described below.

In this example, the inward extension 1988-1 of segment 1985-1 is configured to extend inward to abut against (or nearly abut against) the outer surface of the wall 1989-2 of segment 1985-2. In addition, the outward extension 1986-2 of segment 1985-2 is configured to extend inward to abut against (or nearly abut against) the inner surface of the wall 1989-1 of segment 1985-1. In this case, the outward extension 1986-2 has been manually set about halfway along the height of the wall 1989-2. The height of the combination of segment 1985-1 and segment 1985-2 is at a maximum when the inward extension 1988-1 of segment 1985-1 abuts against the outward extension 1986-2 of segment 1985-2, as shown in FIG. 19.

In addition, in this example, the inward extension 1988-2 of segment 1985-2 is configured to extend inward to abut against (or nearly abut against) the outer surface of the wall 1989-3 of segment 1985-3. In addition, the outward extension 1986-3 of segment 1985-3 is configured to extend inward to abut against (or nearly abut against) the inner surface of the wall 1989-2 of segment 1985-2. The height of the combination of segment 1985-2 and segment 1985-3 is at a maximum when the inward extension 1988-2 of segment 1985-2 abuts against the outward extension 1986-3 of segment 1985-3, as shown in FIG. 19.

Further, in this example, the inward extension 1988-3 of segment 1985-3 is configured to extend inward to abut against (or nearly abut against) the outer surface of the wall 1989-4 of segment 1985-4. In addition, the outward extension 1986-4 of segment 1985-4 is configured to extend inward to abut against (or nearly abut against) the inner surface of the wall 1989-3 of segment 1985-3. In this case, the outward extension 1986-4 has been manually set about halfway along the height of the wall 1989-4. The height of the combination of segment 1985-3 and segment 1985-4 is at a maximum when the inward extension 1988-3 of segment 1985-3 abuts against the outward extension 1986-4 of segment 1985-4, as shown in FIG. 19.

The extendable body 1980 reaches its maximum height 1981 when the inward extension 1988-1 of segment 1985-1 abuts against the outward extension 1986-2 of segment 1985-2, the inward extension 1988-2 of segment 1985-2 abuts against the outward extension 1986-3 of segment 1985-3, and the inward extension 1988-3 of segment 1985-3 abuts against the outward extension 1986-4 of segment 1985-4, as shown in FIG. 19. In certain example embodiments, the various inward extensions 1988 and outward extensions 1986 are strong enough to remain intact when abutting against each other and overcome an upward force imposed by the buoyancy of the platform (e.g., platform 270, platform 370) when the flood warning apparatus (e.g., flood warning apparatus 200) is submerged in water (e.g., water 112) and the extendable body 1980 is at its maximum height 1981. To simplify FIG. 19, features of the extendable body 1980 such as sealing members and coupling features (e.g., coupling features 419) are not shown in FIG. 19 but may otherwise be present.

Figure 20:
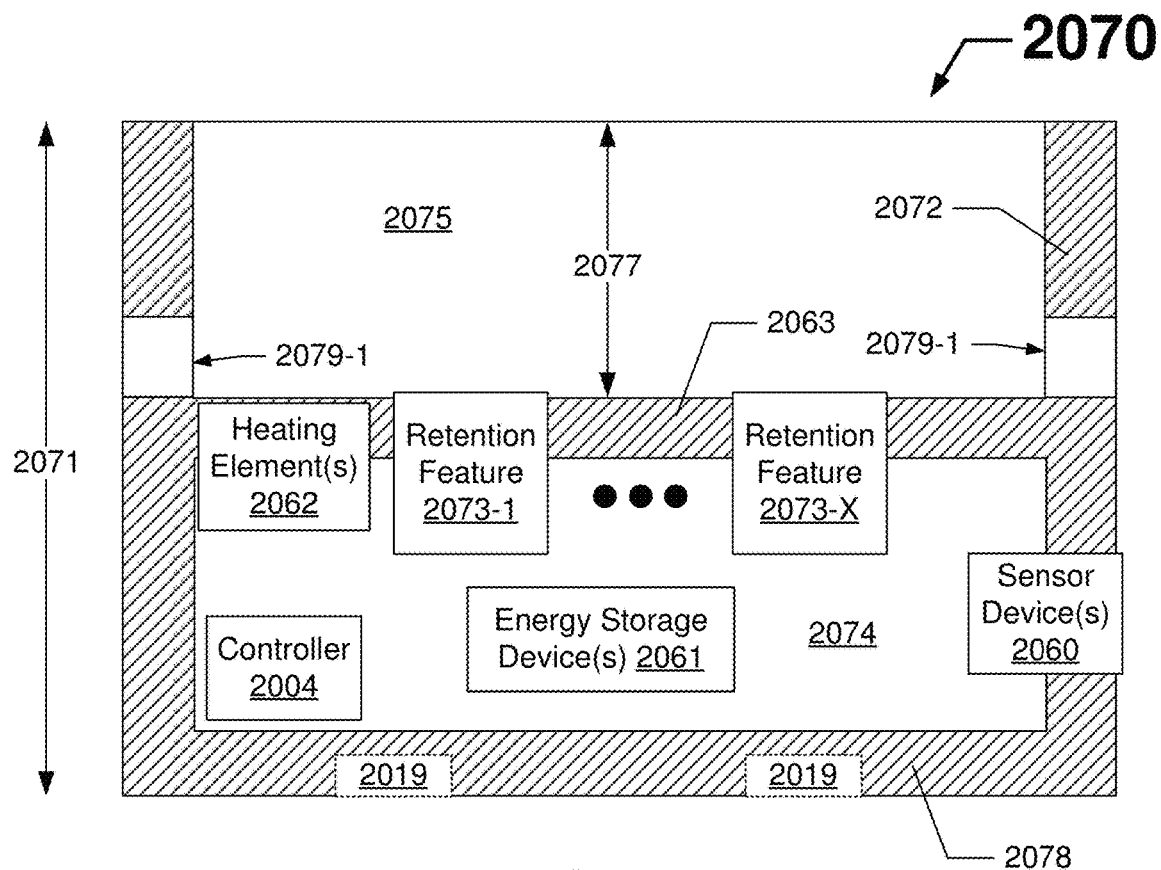
FIG. 20 shows a cross-sectional view of another example platform according to certain example embodiments.

FIG. 20 shows a cross-sectional view of another example platform 2070 according to certain example embodiments. Referring to the description above with respect to FIGS. 1A through 19, the platform 2070 of FIG. 20 is another example embodiment of the platform 270 discussed above with respect to FIG. 2. The platform 2070 includes a controller 2004, one or more sensor devices 2060, one or more energy storage devices 2061, one or more optional coupling features 2019, and one or more retention features 2073. The controller 2004, the sensor devices 2060, the energy storage devices 2061, the heating elements 2062, the coupling features 2019, and the retention features 2073 of the platform 2070 may be substantially the same as the corresponding components of the platforms discussed above.

The platform 2070 in this case has at least one side wall 2072, a bottom wall 2078, and an intermediate wall 2063. The bottom wall 2078, the intermediate wall 2063, and the lower portion of the one or more side walls 2072 form a chamber 2074 that is sealed off from the outside environment. In this case, the controller 2004, some or all of the one or more of the sensor devices 2060, some or all of the one or more energy storage devices 2061, and some or all of the retention features 2073 (retention feature 2073-1 through retention feature 2073-X) are positioned within the chamber 2074. In addition, or in the alternative, some or all of one or more of the sensor devices 2060 and/or one or more of the energy storage devices 2061 may be integrated into a side wall 2072 and/or the intermediate wall 2063. In addition, or in the alternative, some or all of one or more of the retention features 2073 may be integrated into the intermediate wall 2063. In addition, or in the alternative, some or all of one or more of the optional coupling features 2019 may be integrated into the bottom wall 2078.

The top portion of the one or more side walls 2072 and the intermediate wall 2063 form a cavity 2075 that is open at the top. The cavity 2075 has a height 2077 that is less than the height 2071 of the platform 2070. The height 2077 of the cavity 2075 is configured to receive and retain each of the floatation objects (e.g., floatation objects 250) of the flood warning apparatus (e.g., flood warning apparatus 200) until the floatation objects are ready to be released. For example, the cavity 2075 may have a height 2077 that is more than ½ the height of each floatation object in the cavity 2075. If the cavity 2075 takes on water (e.g., from rain) in the absence of a high water event, the water may be evacuated from the cavity 2075 through each of the channels 2079 that traverse a side wall 2072 just above the intermediate wall 2063.

Figure 21:
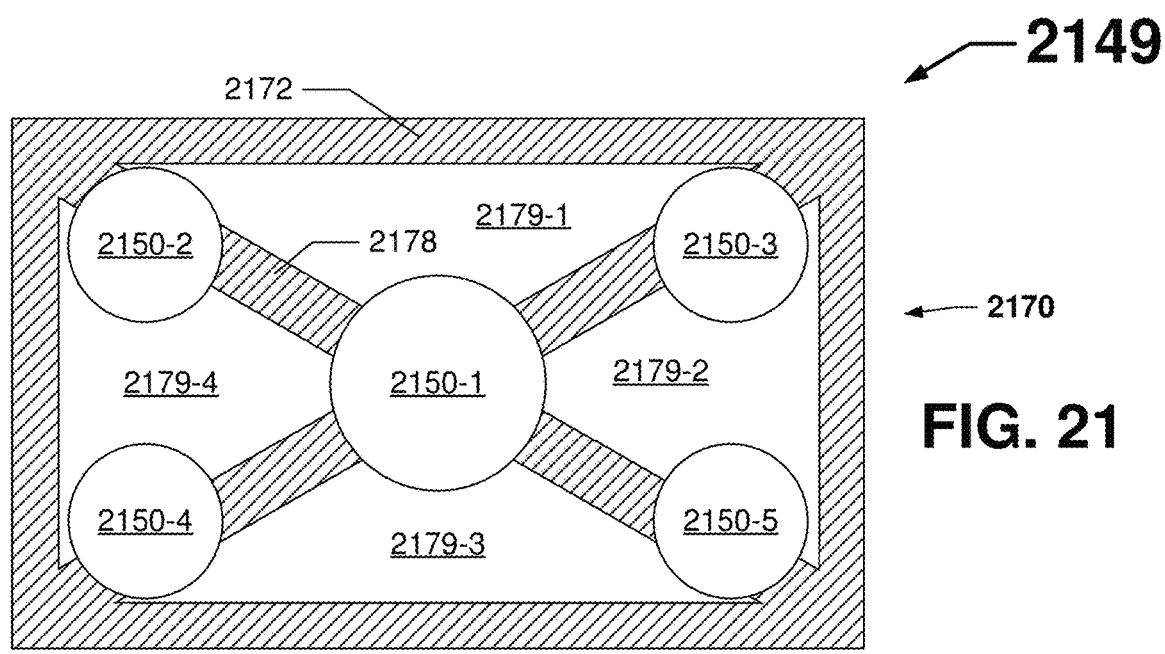
FIGS. 21 and 22 each shows a top view of a subassembly according to certain example embodiments.
Figure 22:
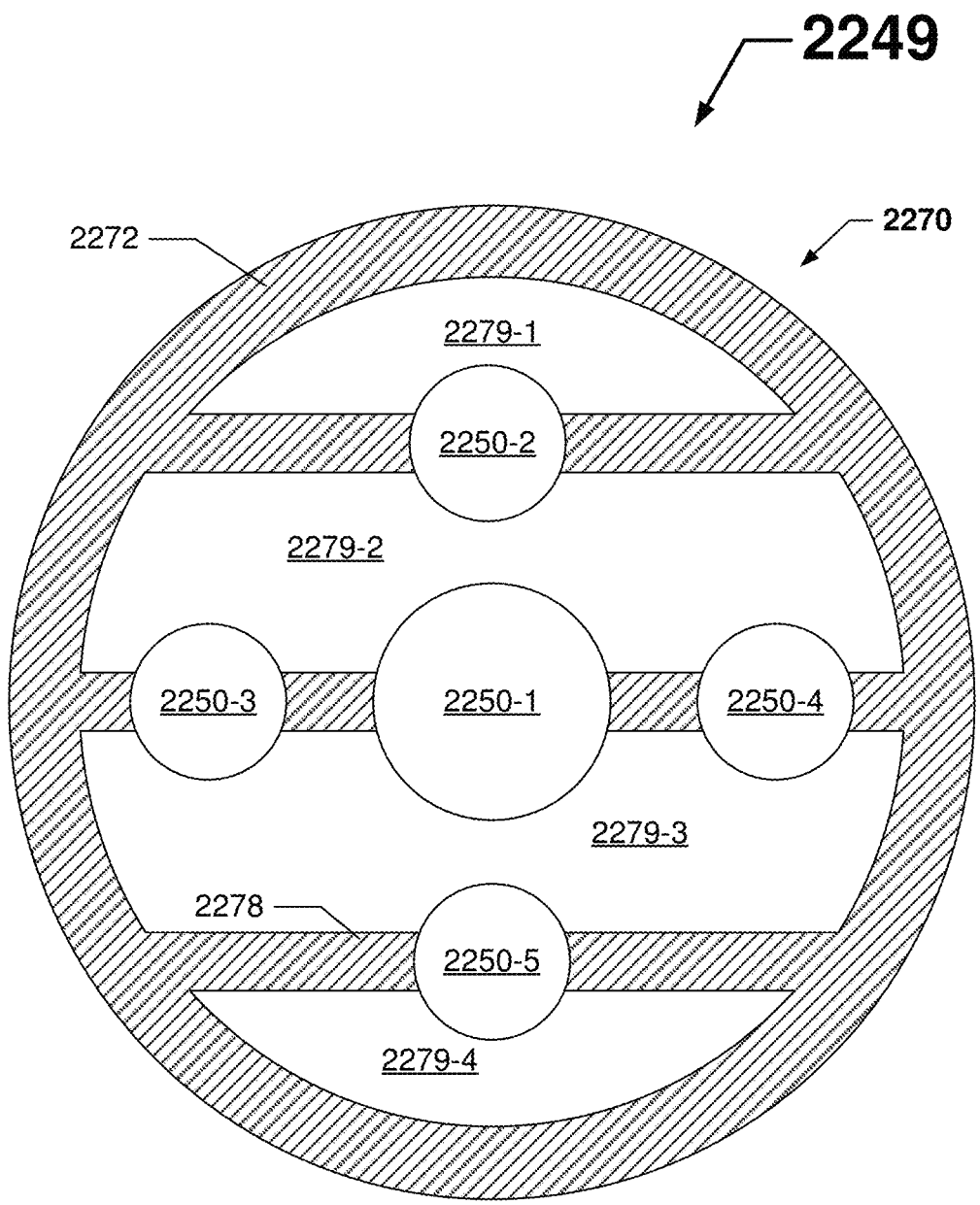

FIGS. 21 and 22 each shows a top view of a subassembly according to certain example embodiments. Specifically, FIG. 21 shows a top view of a subassembly 2149, and FIG. 22 shows a top view of a subassembly 2249. Referring to the description above with respect to FIGS. 1A through 20, the subassembly 2149 of FIG. 21 includes a platform 2170 and five floatation objects 2150 (floatation object 2150-1, floatation object 2150-2, floatation object 2150-3, floatation object 2150-4, and floatation object 2150-5). The platform 2170 and the floatation objects 2150 (including their various components and subcomponents) of FIG. 21 are substantially the same as the platforms and the floatation objects (including their various components and subcomponents) discussed above. The controllers, the sensor devices, the energy storage devices, the heating elements, the chambers, the coupling features, and the retention features are not shown in FIGS. 21 and 22 to simplify the drawings.

In this case, the platform 2170 of the subassembly 2149 of FIG. 21 has four side walls 2172 that forms a rectangle when viewed from above. The platform 2170 also includes a bottom wall 2178 in the form of two diagonally crossing segments that form an "X" when viewed from above, creating four triangle-shaped channels 2179 (channel 2179-1, channel 2179-2, channel 2179-3, and channel 2179-4) that traverse therethrough. The five floatation objects 2150 are retained by five retention features (hidden from view in FIG. 21) of the platform 2170.

All of the floatation objects 2150 are spherical in shape. Floatation object 2150-1 is larger than the other four floatation objects 2150, which are substantially identical in size. Some or all of the floatation objects 2150 may be released from the platform 2170 and activated at substantially the same time in order to provide redundancy. In addition, or in the alternative, some or all of the floatation objects 2150 may be released from the platform 2170 and activated in a sequenced order (e.g., based on different heights of the platform).

The subassembly 2249 of FIG. 22 includes a platform 2270 and five floatation objects 2250 (floatation object 2250-1, floatation object 2250-2, floatation object 2250-3, floatation object 2250-4, and floatation object 2250-5). The platform 2270 and the floatation objects 2250 (including their various components and subcomponents) of FIG. 22 are substantially the same as the platforms and the floatation objects (including their various components and subcomponents) discussed above.

In this case, the platform 2270 of the subassembly 2249 of FIG. 22 has one side wall 2272 that forms a circle when viewed from above. The platform 2270 also includes a bottom wall 2278 in the form of three crossing segments that are parallel with each other, creating four elongated channels 2279 (channel 2279-1, channel 2279-2, channel 2279-3, and channel 2279-4) that are parallel with each other and that traverse therethrough. The five floatation objects 2250 are retained by five retention features (hidden from view in FIG. 22) of the platform 2270.

All of the floatation objects 2250 are spherical in shape. Floatation object 2250-1 is larger than the other four floatation objects 2250, which are substantially identical in size. Some or all of the floatation objects 2250 may be released from the platform 2270 and activated at substantially the same time in order to provide redundancy. In addition, or in the alternative, some or all of the floatation objects 2250 may be released from the platform 2270 and activated in a sequenced order (e.g., based on different heights of the platform).

Figure 23:
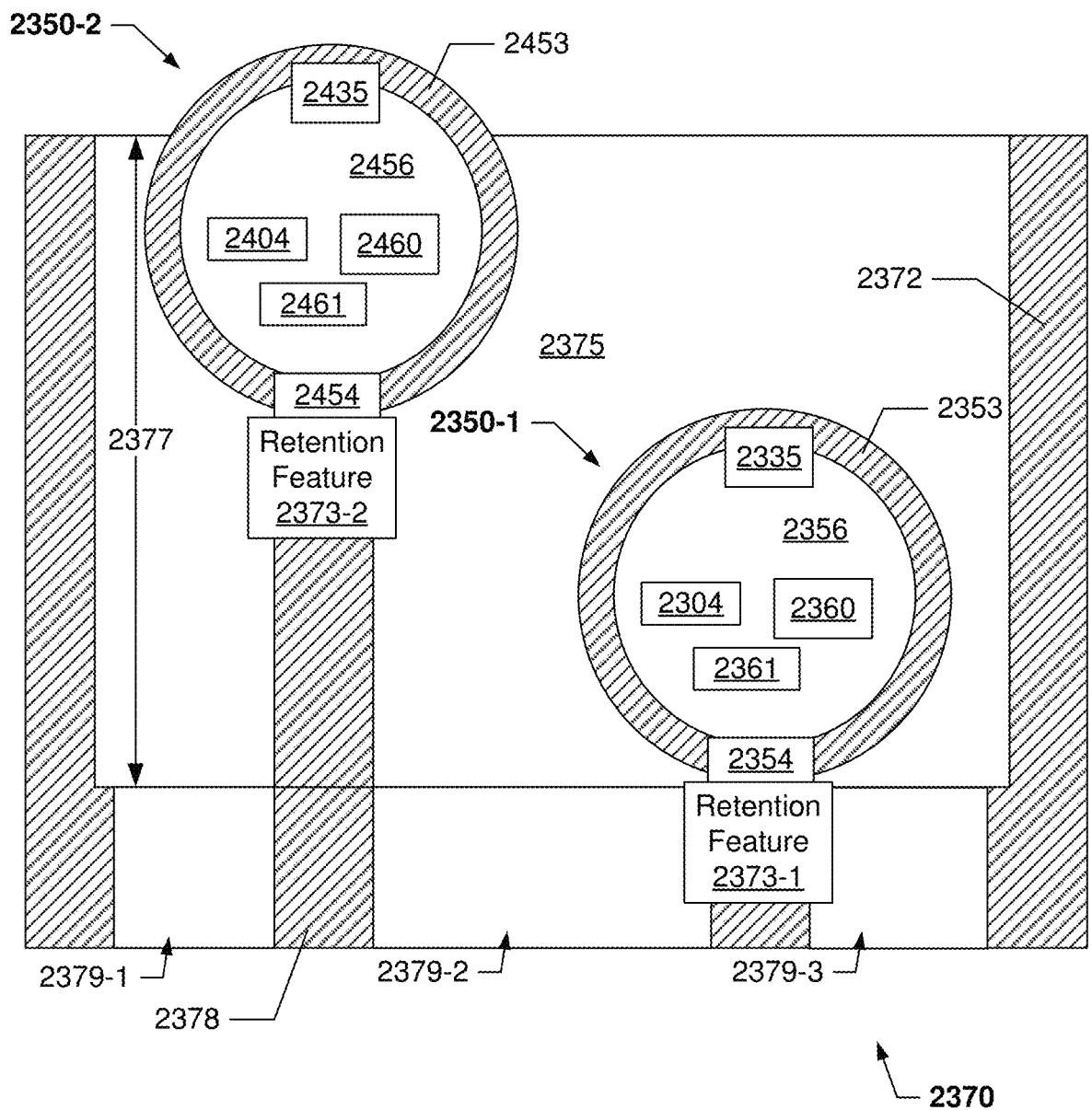
FIG. 23 shows a cross-sectional side view of a subassembly according to certain example embodiments.

FIG. 23 shows a cross-sectional side view of a subassembly 2349 according to certain example embodiments. Referring to the description above with respect to FIGS. 1A through 22, the subassembly 2349 of FIG. 23 includes a platform 2370 and two floatation objects 2350 (floatation object 2350-1 and floatation object 2350-2). The platform 2370 and the floatation objects 2350 (including their various components and subcomponents) of FIG. 23 are substantially the same as the platforms and the floatation objects (including their various components and subcomponents) discussed above.

The platform 2370 has a side wall 2372 and a bottom wall 2378 that form a cavity 2375 that is open at the top. The cavity 2375 has a height 2377 that is sufficient to receive and retain the floatation objects 2350. In this case, the height 2377 of the cavity 2375 is almost twice the height of the floatation objects 2350 in the cavity 2375. In this way, the side wall 2372 provides some protection (e.g., from wind) to the floatation objects 2350 positioned within the cavity 2375 in non-flood events. When viewed from above, the side wall 2372 of the platform 2370 forms a circle.

The platform 2370 has at least three channels 2379 (channel 2379-1, channel 2379-2, and channel 2379-3) that traverse the thickness of the bottom wall 2378. Each channel 2379 is configured to allow for an equilibrium in the waterline outside the cavity 2375 and the waterline within the cavity 2375. The platform 2370 is configured to float on water. As such, as discussed above, with the platform 2370 disposed atop the distal end of an extendable body, the platform 2370 adjusts the height of the extendable body, through it buoyancy, when the water level reaches the height of the platform 2370.

While not shown in FIG. 23, there may be a chamber (e.g., chamber 1274) that is positioned in the side wall 2372 and/or the bottom wall 2378 of the platform 2370. Such a chamber may be isolated from the cavity 2375 and the environment outside the platform 2370, thereby offering some degree of protection to a controller, a sensor device (or portions thereof), a heating element (or portions thereof), and/or an energy storage device (or portions thereof) within the chamber. To simplify the drawing, the coupling features (e.g., similar to the coupling features 319 discussed above) are also omitted from FIG. 23 but may physically be present.

The platform 2370 includes two retention features 2373 (retention feature 2373-1 and retention feature 2373-2) that are configured to retain a floatation object 2350 until a condition is met where each floatation object 2350 is to be released and activated, either simultaneously or sequentially. While the retention feature 2354 of the floatation object 2350-1 is retained by retention feature 2373-1, the notification mechanism 2335 of the floatation object 2350-1 is deactivated. Similarly, while the retention feature 2454 of the floatation object 2350-2 is retained by retention feature 2373-2, the notification mechanism 2435 of the floatation object 2350-2 is deactivated. The configuration of the retention feature 2373-1 and the retention feature 2373-2 may be the same as, or different than, each other. In addition, or in the alternative, the configuration of the retention feature 2354 and the retention feature 2454 may be the same as, or different than, each other.

The floatation object 2350-1 of FIG. 23 is a sphere that has one wall 2353 that forms a cavity 2356 that is enclosed. Within the cavity 2356 (at least in part) are a controller 2304, a sensor device 2360, an energy storage device 2361, the retention feature 2354, and the notification mechanism 2335. Similarly, the floatation object 2350-2 of FIG. 23 is a sphere (in this case, substantially the same size as the floatation object 2350-1) that has one wall 2453 that forms a cavity 2456 that is enclosed. Within the cavity 2456 (at least in part) are a controller 2404, a sensor device 2460, an energy storage device 2461, the retention feature 2454, and the notification mechanism 2435.

In this case, the segment of the bottom wall 2378 on which the retention feature 2373-2 is disposed has a substantially greater height than the height of the segment of the bottom wall 2378 on which the retention feature 2373-1 is disposed. As a result, when the floatation objects 2350 are retained, floatation object 2350-1 is significantly elevated within the cavity 2375 compared to floatation object 2350-1. If the platform 2370 is configured so that the retention feature 2373-1 releases the floatation object 2350-1 before the retention feature 2373-2 releases the floatation object 2350-2, then the retention feature 2373-2 of the platform 2370 and/or the retention feature 2454 of the floatation object 2350-2 may be designed to have a stronger retention force to overcome a force that the floatation object 2350-1 may apply to the floatation object 2350-2 within the cavity 2375 after floatation object 2350-1 has been released and gravitates toward the top of the cavity 2375.

In such a case, the notification mechanism 2335 of the floatation object 2350-1 may broadcast a lower volume, less visual, and/or otherwise reduced output (e.g., a medium alert) relative to an increased output of the notification mechanism 2435 of the floatation object 2350-2. Alternatively, in the case of redundancy design, when the floatation object 2350-1 is released, the retention feature 2373-2 of the platform 2370 may be configured to release the floatation object 2350-2 when the floatation object 2350-1 makes contact with the floatation object 2350-2 as the floatation object 2350-1 travels toward the top of the cavity 2375.

In certain alternative embodiments, the retention feature 2373-2 of the platform 2370 may be configured to release the floatation object 2350-2 before the retention feature 2373-1 of the platform 2370 may be configured to release the floatation object 2350-1. The configuration of retention feature 2373-1 of the platform 2370 may be the same as, or different than, the configuration of retention feature 2373-2 of the platform 2370. In addition, or in the alternative, the configuration of retention feature 2354 of the floatation object 2350 may be the same as, or different than, the configuration of retention feature 2454 of the floatation object 2450.

The example embodiments discussed herein are directed to systems, apparatuses, methods, and devices for warning about a flood and/or an impending flood of a waterway. Example embodiments may be used with one or more types of waterway (e.g., creeks, rivers, bayous, washes, culverts), in one or more types of terrain (e.g., forested, cleared, flat, hilly, mountainous), and/or one or more geographic locations.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of +10 percent of the given numeric value provided such a deviation does not alter the end function or result of the value. Therefore, a value of about 1% may be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or a combination thereof, it is understood that this phrase describes all of the various individual and collective combinations and permutations of these components. For example, in some embodiments, the item described by this phrase could include only a component of type A.

In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C.

In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C).

In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Example embodiments of flood warning apparatuses and related systems (including portions thereof) can be made of one or more of a number of suitable materials to allow the associated system or subsystem to meet certain standards and/or regulations while also maintaining durability in light of the one or more conditions under which the example embodiments of flood warning apparatuses and/or other associated components of the example embodiments of flood warning apparatuses may be exposed. Examples of such materials can include, but are not limited to, aluminum, stainless steel, carbon steel, fiberglass, glass, plastic, thermoplastic, ceramic, polyethylene, polypropylene, a composite material, and rubber.

Example embodiments (including portions thereof) can be designed to comply with certain standards and/or requirements. Examples of entities that set such standards and/or requirements can include, but are not limited to, the Environmental Protection Agency, (EPA), Underwriters' Laboratories (UL), the International Standards Organization (ISO), the International Association of Classification Societies (IACS), and the Occupational Safety and Health Administration (OSHA).

Example embodiments of flood warning apparatuses, or portions or components thereof, described herein can be made from a single piece (e.g., as from a mold, injection mold, casting, die cast, forging, extrusion process, or 3D printing). In addition, or in the alternative, example embodiments of flood warning apparatuses (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example of flood warning apparatus to become coupled, directly or indirectly, to one or more other components of the embodiment of the flood warning apparatus and/or to some other component of a system or subsystem. A coupling feature can include, but is not limited to, a clamp, a portion of a hinge, an aperture, a recessed area, a protrusion, a hole, a slot, a tab, a detent, and mating threads. One portion of an example embodiment of a flood warning apparatus can be coupled to another component of the example flood warning apparatus and/or to some other component of a system or subsystem by the direct use of one or more coupling features.

In addition, or in the alternative, a portion of an example embodiment of a flood warning apparatus can be coupled to another component of the example flood warning apparatus and/or to another component of a system or subsystem using one or more independent devices that interact with one or more coupling features disposed on a component of the example embodiment of a flood warning apparatus. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

If a component of a figure is described but not expressly shown or labeled in that figure, the label used for a corresponding component in another figure may be inferred to that component. Conversely, if a component in a figure is labeled but not described, the description for such component may be substantially the same as the description for the corresponding component in another figure. The numbering scheme for the various components in the figures herein is such that each component is a three-digit number or a four-digit number, and corresponding components in other figures have the identical last two digits. For a figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of flood warning apparatuses and related systems will be described more fully hereinafter with reference to the accompanying drawings, in which example embodiments of flood warning apparatuses and related systems are described. Flood warning apparatuses and related systems may, however, be embodied in many different forms and should not be construed as limited to the example embodiments set forth herein. Rather, these example embodiments are provided so that this disclosure will be thorough and complete, and will fully convey the scope of flood warning apparatuses and related systems to those of ordinary skill in the art. Like, but not necessarily the same, elements (also sometimes called components) in the various figures are denoted by like reference numerals for consistency.

Terms such as "first", "second", "outer", "inner", "top", "bottom", "above", "below", "distal", "proximal", "front,", "rear," "left," "right," "on", and "within", when present, are used merely to distinguish one component (or part of a component or state of a component) from another. This list of terms is not exclusive. Such terms are not meant to denote a preference or a particular orientation, and they are not meant to limit embodiments of flood warning apparatuses and related systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Example embodiments may be used for providing an automated form of emitting a warning of an imminent flood event to people in proximity to a waterway before the flood event reaches that location in real time. Example embodiments require no human interaction and/or intervention to effectuate. Also, example embodiments may be implemented and broadcast high water alert notifications, regardless of whether people nearby have a digital device and regardless of whether electrical power is serving that location. Example embodiments may be capable of communicating using communication signals in addition to broadcasting high water alert notifications. Example embodiments may provide a number of benefits. Such benefits may include, but are not limited to, ease of use, ease of maintenance, minimal upkeep, flexibility, configurability, reliable and timely flood warning notifications, no need for human involvement to implement, no concern about "notification fatigue" for intended recipients, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to a specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A flood warning apparatus comprising:
   a foundation configured to mount to a ground;
   an extendable body that extends above the foundation, wherein the extendable body is configured to move within a range bounded by a minimum body height and a maximum body height, and wherein the extendable body is configured to have a position within the range based on a level of water in a waterway that covers the foundation;
   a platform disposed atop the extendable body, wherein the platform comprises a retention feature, and wherein the platform is buoyant; and
   a floatation object comprising a notification mechanism, wherein the floatation object is configured to be retained by the retention feature of the platform when the position of the extendable body is less than the maximum body height, wherein the floatation object is further configured to be released from the platform by the retention feature when the level of water in the waterway exceeds a threshold value, wherein the floatation object is buoyant, and wherein the notification mechanism is configured to activate when the floatation object is released from the platform by the retention feature.

2. The flood warning apparatus of claim 1, wherein the extendable body comprises a plurality of segments having a telescoping configuration.

3. The flood warning apparatus of claim 1, wherein the platform is configured to float on the water, and wherein the platform adjusts the position of the extendable body within the range when the level of the water is no greater than a platform height of the platform when the extendable body is at the maximum body height.

4. The flood warning apparatus of claim 3, wherein the platform maintains the extendable body at the maximum body height when the level of the water exceeds the platform height of the platform.

5. The flood warning apparatus of claim 1, wherein the platform further comprises a sensor device that is configured to measure a parameter associated with the water in the waterway.

6. The flood warning apparatus of claim 1, wherein the range of the extendable body is adjustable upon installation.

7. The flood warning apparatus of claim 1, wherein the notification mechanism is configured to broadcast an alert notification when the floatation object is released from the platform by the retention feature.

8. The flood warning apparatus of claim 7, wherein the notification mechanism is further configured to broadcast a medium alert notification when the position of the extendable body exceeds a threshold value after the floatation object is released from the platform by the retention feature.

9. The flood warning apparatus of claim 7, wherein the alert notification comprises an audible alert.

10. The flood warning apparatus of claim 1, wherein the floatation object is spherical.

11. The flood warning apparatus of claim 1, wherein the floatation object further comprises a GPS and a transmitter, wherein the transmitter is configured to broadcast a location of the floatation object based on the GPS.

12. The flood warning apparatus of claim 1, wherein the platform further comprises a side wall having a wall height sufficient to retain the floatation object in an absence of water inside a cavity formed by the retaining wall.

13. The flood warning apparatus of claim 1, wherein the retention feature comprises a reed switch, and wherein the floatation object comprises a magnet.

14. The flood warning apparatus of claim 1, wherein the notification mechanism is configured to be remotely tested while the floatation object is retained by the retention feature of the platform.

15. The flood warning apparatus of claim 1, wherein the ground is configured to be in the waterway or adjacent to the waterway when the extendable body is at the minimum body height.

16. The flood warning apparatus of claim 1, further comprising:
a second floatation object comprising a second notification mechanism, wherein the second floatation object is configured to be retained by a second retention feature of the platform when the position of the extendable body is less than a threshold height value, wherein the second floatation object is further configured to be released from the platform by the retention feature when the level of water in the waterway exceeds the threshold height value, wherein the threshold height value is less than the maximum body height, wherein the second floatation object is buoyant, and wherein the second notification mechanism is configured to activate when the second floatation object is released from the platform by the second retention feature.

17. The flood warning apparatus of claim 16, wherein the retention feature has a first configuration that differs from a second configuration of the second retention feature.

18. The flood warning apparatus of claim 16, wherein the retention feature continues to retain the floatation object after the second retention feature releases the second floatation object.

19. A real time flood event coordination system comprising:
a plurality of flood warning apparatuses, wherein each of the plurality of flood warning apparatuses is positioned in or proximate to a waterway, and wherein each of the plurality of flood warning apparatuses comprises:
a foundation configured to mount to a ground;
an extendable body that extends above the foundation, wherein the extendable body is configured to move within a range bounded by a minimum body height and a maximum body height, and wherein the extendable body is configured to have a position within the range based on a level of water in a waterway that covers the foundation;
a platform disposed atop the extendable body, wherein the platform comprises a retention feature, and wherein the platform is buoyant; and
a floatation object comprising a notification mechanism, wherein the floatation object is configured to be retained by the retention feature of the platform when the position of the extendable body is less than the maximum body height, wherein the floatation object is further configured to be released from the platform by the retention feature when the level of water in the waterway exceeds a threshold value, wherein the floatation object is buoyant, and wherein the notification mechanism is configured to activate when the floatation object is released from the platform by the retention feature; and
a user system communicably coupled to the floatation object of each of the plurality of flood warning apparatuses, wherein the user system is configured to generate and send a notification about a flood event in the waterway based on the notification mechanism of at least one floatation object being activated.

20. The real time flood event coordination system of claim 19, wherein the user system is further configured to generate and send a forecast of an imminent flood event in the waterway based on information received from at least one of a group comprising a platform and a floatation object before the notification mechanism of the floatation object is activated.

* * * * *